US009238220B2

(12) United States Patent
Morita et al.

(10) Patent No.: US 9,238,220 B2
(45) Date of Patent: Jan. 19, 2016

(54) METHOD FOR FORMING TITANIUM OXIDE FILM ON SURFACE OF MOLDED PRODUCT COMPOSED OF CYCLIC OLEFIN RESIN

(71) Applicant: USHIO DENKI KABUSHIKI KAISHA, Tokyo (JP)

(72) Inventors: Kinichi Morita, Tokyo (JP); Toshikazu Kawaguchi, Hokkaido (JP); Katsuaki Shimazu, Hokkaido (JP); Tadao Kimijima, Tochigi (JP)

(73) Assignee: Ushio Denki Kabushiki Kaisha, Tokyo (JP)

( * ) Notice: Subject to any disclaimer, the term of this patent is extended or adjusted under 35 U.S.C. 154(b) by 57 days.

(21) Appl. No.: 14/081,476

(22) Filed: Nov. 15, 2013

(65) Prior Publication Data

US 2014/0141962 A1    May 22, 2014

(30) Foreign Application Priority Data

Nov. 16, 2012   (JP) .................................. 2012-252225

(51) Int. Cl.
| | | |
|---|---|---|
| *B01J 37/14* | (2006.01) | |
| *B01J 37/34* | (2006.01) | |
| *B01J 21/06* | (2006.01) | |
| *B01J 31/06* | (2006.01) | |
| *B01J 35/00* | (2006.01) | |

(52) U.S. Cl.
CPC ............... *B01J 37/14* (2013.01); *B01J 21/063* (2013.01); *B01J 31/063* (2013.01); *B01J 35/004* (2013.01); *B01J 37/345* (2013.01)

(58) Field of Classification Search
CPC ......... B01J 37/14; B01J 37/345; B01J 21/063
See application file for complete search history.

(56) References Cited

U.S. PATENT DOCUMENTS

2007/0298190 A1*  12/2007  Kobori et al. .................. 427/595
2011/0286094 A1*  11/2011  Kaida et al. .............. 359/485.05

FOREIGN PATENT DOCUMENTS

| JP | H10-139482 A | 5/1998 |
|---|---|---|
| JP | 2785433 B2 | 8/1998 |
| JP | 2001-262008 A | 9/2001 |
| JP | 2003-105262 A | 4/2003 |
| JP | 2011-195798 A | 10/2011 |

* cited by examiner

*Primary Examiner* — Dah-Wei D Yuan
*Assistant Examiner* — Nga Leung V Law
(74) *Attorney, Agent, or Firm* — Michael Best & Friedrich LLP

(57) ABSTRACT

A method for forming a titanium oxide film that can be formed on a surface of a base material without a heating step. In Step 0, a surface of a molded product (base material) composed of a cyclic olefin-based resin is irradiated with ultraviolet light in an air atmosphere. In Step 1, the base material is immersed in a mixed liquid of an aqueous solution of titanium chloride and a nitrite ion-containing aqueous solution. A titanium oxide film grows by repeating oxidation of a titanium ion. In Step 2, the base material is pulled out from the mixed liquid, and then washed to stop the reaction. The film thickness can be controlled by controlling this immersion time. In Step 3, the base material after washing is dried at room temperature.

6 Claims, 16 Drawing Sheets

METHOD FOR FORMING TITANIUM OXIDE FILM ON SURFACE OF MOLDED PRODUCT COMPOSED OF CYCLIC OLEFIN RESIN

CROSS-REFERENCES TO RELATED APPLICATION

This application claims priority from Japanese Patent Application Serial No. 2012-252225 filed on Nov. 16, 2012, the contents of which, including specification, claims and drawings, are incorporated herein by reference in their entirety.

TECHNICAL FIELD OF THE INVENTION

The present invention relates to a method for forming a titanium oxide film on a molded product composed of a cyclic olefin-based resin.

BACKGROUND OF THE INVENTION

Heretofore, titanium oxide having high refractive index and excellent chemical stability has been used in various industrial fields.

Titanium oxide is classified based on the crystal structure thereof into rutile type, anatase type, and brookite type. However, what is actually industrially used is rutile type and anatase type.

Titanium oxide has high refractive index and high light scattering ability, and therefore, when it is in a powder state, it becomes a white powder. Titanium oxide in such a powder state is used in a large amount as a white pigment in paints, plastics, papers, inks, etc. In particular, titanium oxide having a rutile crystal structure with high thermal stability (hereinafter referred to as "rutile-type titanium oxide") has a stable crystal structure, high thermal stability, and high light-screening ability, and therefore is used as a white pigment material for paints. Further, for example, rutile-type titanium oxide having a particle diameter of 0.1 μm or less has high transmittance with respect to visible light, but has low transmittance with respect to ultraviolet light, and therefore is often blended in sunscreen cosmetics, etc.

On the other hand, titanium oxide is an effective photocatalytically active substance, and therefore is used as a photocatalyst in various industrial fields. At present, there is no substance adopted as a photocatalyst for practical use other than titanium oxide.

In particular, titanium oxide having an anatase crystal structure (hereinafter referred to as "anatase-type titanium oxide") has higher reduction ability than rutile-type titanium oxide and has characteristics to exhibit higher photocatalytic activity. Accordingly, in general, anatase-type titanium oxide is often used as a photocatalyst.

Anatase-type titanium oxide has a wide band gap and exhibits photocatalytic activity only when it is irradiated with ultraviolet light with a wavelength of about 380 nm or less corresponding to the band gap. For example, in the atmosphere, when anatase-type titanium oxide absorbs ultraviolet light with a wavelength of about 380 nm or less, it oxidatively decomposes an organic substance or the like located in contact with or in the vicinity of the surface of the anatase-type titanium oxide.

Further, when anatase-type titanium oxide is irradiated with the above-described ultraviolet light, it exhibits superhydrophilic activity such that the water contact angle of the surface thereof is 5° or less.

Therefore, by retaining titanium oxide on the surface of a base material, a photocatalytic function is imparted to the surface of the base material, and further, the surface becomes a hydrophilic surface. A base material in which such a photocatalytic function is imparted to the surface thereof is used in the antibacterial, deodorant, and antifouling fields, etc.

For example, if a titanium oxide coating is applied to automobile mirrors, road mirrors, etc., since the mirror surface is hydrophilic, water adhering to the surface does not turn into droplets, and dirt on the mirror surface is washed off, and thus, visibility in the rain is improved. Further, since a photocatalytic function is imparted to the surface, even if an organic impurity such as an oil is adhered thereto, the organic substance is decomposed by irradiating the surface with ultraviolet light during the day.

As described above, when titanium oxide is used as a photocatalyst in industry, it is general that the above-described titanium oxide is fixed to the surface of a base material, and a photocatalytic function is imparted to the surface of the base material. In the fixation of titanium oxide to the base material, a wet process in which a coating agent containing titanium oxide is used or a dry process in which a titanium oxide film is formed in vacuum is adopted.

What is used in a relatively wide range at present is a wet process, and as a starting material for fixing titanium oxide to a base material in a wet process, in general, a titanium oxide powder, a titanium oxide sol obtained by dispersing titanium oxide fine particles having a size of about 10 nm in water or a solvent, or a titanium compound such as a titanium alkoxide which is a precursor of titanium oxide is used. Incidentally, the above-described titanium oxide powder is used by dispersing it in a solvent, but this dispersion has a problem that when the dispersion is applied, it is easily rendered white. Therefore, in a wet process in general, a titanium oxide sol in which titanium oxide, which is fine to such an extent that light is not scattered, is dispersed without causing aggregation or a titanium compound such as a titanium alkoxide is often adopted.

The fixation of titanium oxide to a base material is performed, for example, as follows.

In the case of a titanium oxide sol, first, a titanium oxide sol is applied to a surface of a base material to which a photocatalytic function is imparted. Then, the sol is dried at a high temperature, whereby a titanium oxide film is obtained on the surface of the base material.

In the case of using a titanium compound, first, for example, a titanium alkoxide such as titanium isopropoxide is dissolved in an alcohol solvent to effect hydrolysis, whereby a titania sol in which fine particles of a hydroxide of titanium are dissolved is formed. The thus formed titania sol is applied to a surface of a base material to which a photocatalytic function is imparted, followed by firing at a temperature of, for example, about 600° C. or lower, whereby a titanium oxide film is obtained on the surface of the base material. A similar example is described in Japanese Patent Application Publication No. 2001-262008.

Incidentally, the usage examples of a titanium compound vary. For example, in Japanese Patent Application Publication No. 2011-195798 discloses an example in which titanium hydroxide obtained by hydrolyzing a halide of titanium is dissolved in an aqueous solution of an organic strong base, and further a hydroxide polymer is added thereto, and the resulting material is used.

In the case where titanium oxide is fixed to a base plate having low thermal resistance, a method in which a coating material containing titanium oxide fine particles and a curable binder (a coating agent obtained by adding a binder to a titanium oxide sol) is applied to a base material, and titanium oxide is fixed to the surface of the base material by utilizing the curing of the binder is generally used. Incidentally, an organic binder which has been conventionally used in a paint causes deterioration such as chalking in a short time due to the high oxidative ability of photocatalytic titanium oxide, and therefore, in order to design the composition of a photocatalytic coating material, an inorganic binder resistant to oxidation is used. An example of using such a binder is disclosed in, for example, Japanese Patent Application Publication No. 2003-105262.

Incidentally, as the dry process, various methods such as vapor deposition, sputtering, ion beam mixing, ion implantation, and CVD are used at present. Further, a study of a thermal spraying method in which film formation is performed in the air has been performed.

Further, recently, a thin-film production process using an anodization method utilizing an electrochemical reaction in an aqueous solution or a liquid-phase deposition (LPD) method utilizing a chemical reaction in an aqueous solution is also performed. For example, Japanese Patent No. 2785433 discloses a process in which a base material is immersed in an aqueous solution, in which ammonium fluorotitanate or titanium hydrofluoride is contained and boric acid or aluminum chloride for capturing fluorine ions is added, whereby a titanium oxide film is formed on a surface of the base material. Further, Japanese Patent Application Publication No. 10-139482 discloses a process in which a base material is immersed in an aqueous solution of titanyl sulfate, whereby a titanium oxide film is formed on a surface of the base material by hydrolysis of titanyl sulfate.

As described above, in the case where titanium oxide is fixed to a surface of a base material by a wet process, the process includes: an application step in which a titanium oxide coating agent such as a titanium oxide sol or a titanium compound such as a titanium alkoxide is applied to a surface of a base material; and a firing step in which the titanium oxide coating agent is fired along with the base material with the titanium oxide coating agent applied thereto to form a film of crystallized titanium oxide on the surface of the base material. In particular, in the case of using a titanium alkoxide, before the application step, a titania sol forming step in which fine particles of a hydroxide of titanium are dissolved, thereby forming a titania sol is needed.

That is, in a method for fixing titanium oxide as described above, the steps are complicated. Further, as described above, a firing step is needed, and therefore, the base material to which titanium oxide is applied is required to have thermal resistance.

On the other hand, in the case where it is necessary to use a base material having low thermal resistance, as described above, a coating agent obtained by adding a binder to a titanium oxide sol is applied to a base material, and titanium oxide is fixed to the surface of the base material by curing the binder. This method enables titanium oxide to be fixed to a base material having low thermal resistance, but has a problem that since a large amount of the inorganic binder is used for improving the adhesiveness of titanium oxide to a base plate, the photocatalytic activity is deteriorated.

On the other hand, in the fixation of titanium oxide to a base material by a dry process, a titanium oxide film is formed in vacuum as described above, and therefore, a large-scale film forming apparatus provided with a vacuum unit is needed. Further, in such a film forming process, generally, it is necessary to heat the base material on which a titanium oxide film is formed. Therefore, it is difficult to fix titanium oxide to a base material having low thermal resistance by a dry process.

For example, in the case where a titanium oxide film is formed on a base material by a vapor deposition method, a film is formed in an undesired region of the base material, or it is difficult to control the film thickness, or the film thickness is not always uniform. Further, the process generally has a problem that a film cannot be formed on a base material having a complicated shape other than a plain plate.

In addition, in the case of using a stencil for preventing the formation of a film in an undesired region, a problem arises that the film thickness in a peripheral portion of a region in which the film is formed is increased.

The anodization method is a method in which a base material is made the anode, and the anode is oxidized by an electrochemical reaction, whereby a film is formed, and therefore, the base material on which a titanium oxide film is formed is limited to titanium or a titanium alloy.

Further, in the LPD method disclosed in Japanese Patent No. 2785433, it is necessary to use a substance which is difficult to handle and has a safety problem such as ammonium fluorotitanate or titanium hydrofluoride, and moreover, it is necessary to additionally add an agent for capturing fluorine ions, and therefore, the steps are complicated, and thus, the method has a problem from the viewpoint of practical use. On the other hand, in a film forming process utilizing hydrolysis as disclosed in Japanese Patent Application Publication No. 10-139482, it is necessary to set the temperature of a solution to a higher temperature than room temperature for accelerating the hydrolysis reaction, and thus, the uniformity of the film thickness is poor due to the effect of convection flow.

SUMMARY OF THE INVENTION

The invention relates to a method for forming a titanium oxide film on a surface of a molded product composed of a cyclic olefin resin that includes: (1) preparing a molded product that contains a cyclic olefin resin; (2) irradiating a surface of the molded product with a light that includes ultraviolet light of a wavelength of 340 nm or less in an oxygen-containing air atmosphere; and (3) immersing the molded product in a mixed liquid of an aqueous solution of titanium chloride and a nitrite ion-containing aqueous solution.

The method of the invention may further include the steps of pulling out the molded product from the mixed liquid, washing the molded product with water to stop the film forming process, and drying the molded product at room temperature.

A portion of the surface of the molded product may be selectively irradiated with the ultraviolet light, and the titanium oxide film may be formed on the selectively irradiated surface.

DETAILED DESCRIPTION OF THE INVENTION

The present invention has been made in view of the above circumstances, and has an object to provide a method for forming a titanium oxide film on a base material, with which a titanium oxide film can be easily formed on a surface of a base material without resort to a heating step required in a conventional method, and the thickness of the titanium oxide film can be controlled.

According to the method for forming a titanium oxide film of the present invention, titanium oxide can be easily fixed to a base material which is particularly a molded product composed of a cyclic olefin-based resin.

Figure 1:
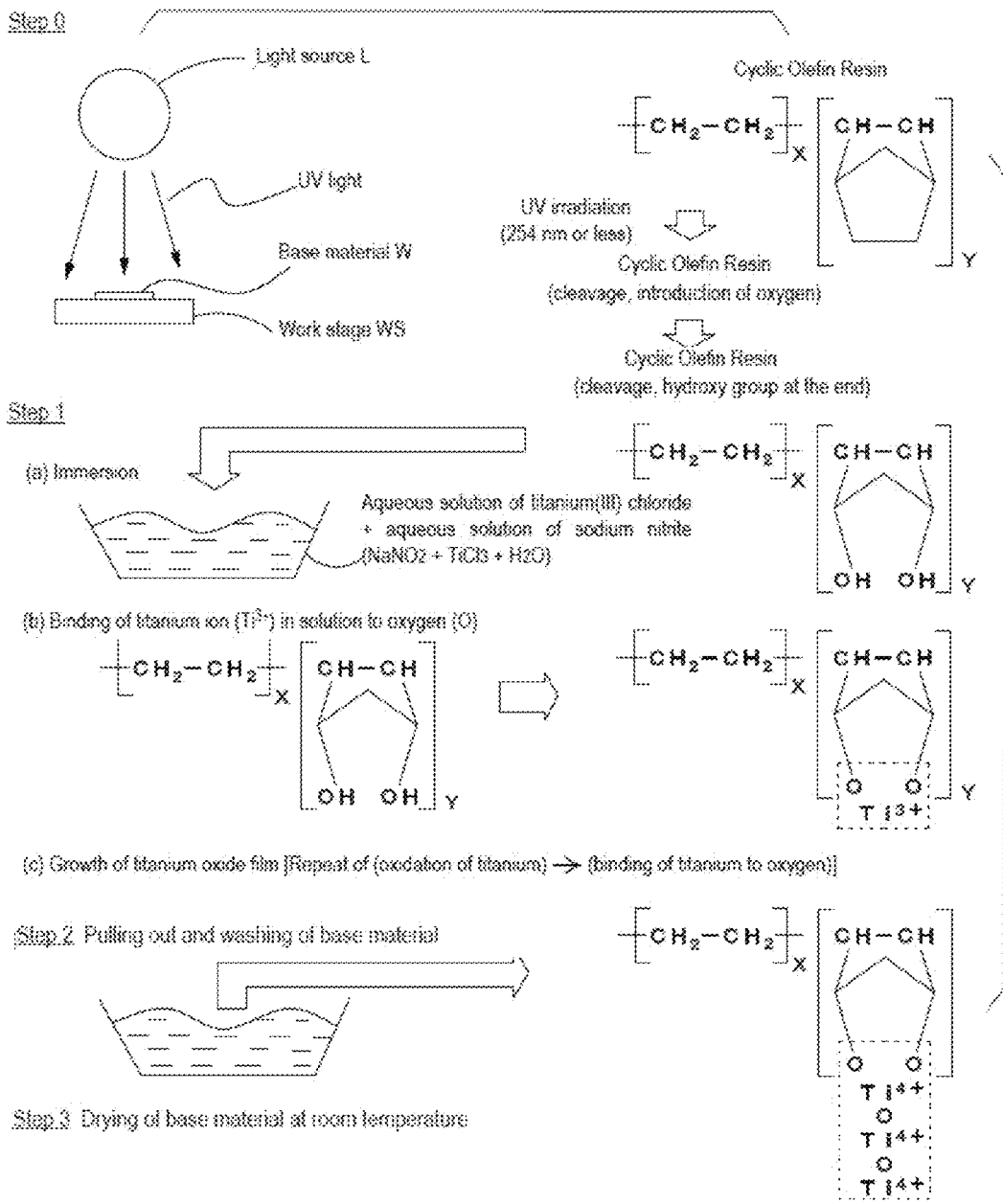
FIG. 1 is a view for explaining the outline of the present invention.

As a result of intensive studies made by the present inventors, it was confirmed that by subjecting a base material which is a molded product composed of a cyclic olefin-based resin to the following Step 0 to Step 3 shown in FIG. 1, a titanium oxide film can be formed on the molded product composed of a cyclic olefin-based resin.

(Step 0): A surface of a base material W which is a molded product composed of a cyclic olefin-based resin for fixing titanium oxide is irradiated with ultraviolet light from a light source L in an oxygen-containing air atmosphere.

By doing this, as shown in Step 0 of FIG. 1, an olefin ring of the cyclic olefin-based resin is cleaved. Then, it is considered that oxygen in the air is introduced at the cleavage site, and in the end, a group at the end of the olefin ring becomes a hydroxy group.

(Step 1): The above base material is immersed in a mixed liquid of an aqueous solution of titanium chloride and a nitrite ion-containing aqueous solution (for example, an aqueous solution of sodium nitrite) (Step 1(*a*) of FIG. 1).

As a result of the immersion, as shown in Step 1(*b*) of FIG. 1, hydrogen is removed from the end of a hydroxy group of the cyclic olefin-based resin molded product, and oxygen and a titanium ion in the mixed liquid are bound to each other.

Then, a titanium oxide film grows on the ultraviolet light-irradiated surface of the cyclic olefin-based resin molded product by repeating oxidation of a titanium ion with a nitrite ion, binding of the oxidized titanium ion to oxygen, and binding of the bound oxygen to a titanium ion at the end of the cleaved olefin ring of the cyclic olefin-based resin molded product (Step 1(*c*) of FIG. 1).

(Step 2): After the lapse of a predetermined time, as shown in Step 2 of FIG. 1, the base material is pulled out from the mixed liquid and washed. That is, by washing with pure water, the reaction is stopped.

The thickness of the titanium oxide film on the base material increases as the immersion time increases. However, by pulling the base material out from the mixed liquid and washing the base material, the reaction of forming the titanium oxide film is stopped. It is considered that by controlling this immersion time, the thickness of the titanium oxide film can be controlled.

(Step 3): The base material after washing is dried at room temperature.

In the above-described Step 0, it is also possible to form the titanium oxide film in a portion on the base material composed of a cyclic olefin-based resin by selectively irradiating the base material composed of the cyclic olefin-based resin molded product with ultraviolet light through a mask having an opening with a shape corresponding to the shape of a region where the titanium oxide film is formed.

As the ultraviolet light, light including light with a wavelength of 340 nm or less (preferably light with a wavelength of 180 nm or less) is irradiated on the surface. Specifically, as described in embodiments below, for example, monochromatic light with a center wavelength of 172 nm emitted from a vacuum ultraviolet excimer lamp is irradiated on the surface.

That is, in the present invention, the above-described object is achieved as follows.

(1) A surface of a molded product composed of a material containing a cyclic olefin resin is irradiated with light including ultraviolet light with a wavelength of 340 nm or less in an oxygen-containing air atmosphere, and then, the molded product is immersed in a mixed liquid of an aqueous solution of titanium chloride and a nitrite ion-containing aqueous solution, whereby a titanium oxide film is formed on the surface of the molded product composed of a cyclic olefin resin.

(2) After the lapse of a predetermined time from the initiation of immersion of the molded product in the mixed liquid in the above (1), the molded product is pulled out from the mixed liquid, washed with water to stop the film forming process, and then, the molded product after washing with water is dried at room temperature.

(3) In the above (1) or (2), a portion of the surface of the molded product is selectively irradiated with the ultraviolet light, and the titanium oxide film is formed on this selectively irradiated surface.

According to the present invention, the following advantageous effects can be obtained.

(1) Since a titanium oxide film is formed on a surface of a molded product composed of a cyclic olefin resin by irradiating a surface of the molded product with light including ultraviolet light with a wavelength of 340 nm or less, and then, immersing the molded product in a mixed liquid of an aqueous solution of titanium chloride and a nitrite ion-containing aqueous solution, a firing step of performing heating to several hundred degrees Celsius for crystallizing titanium oxide on a base material is not needed. Accordingly, it becomes possible to fix titanium oxide also to a material having low thermal resistance to high temperatures.

In addition, a titanium oxide film can be formed on the surface of a base material without using a binder, and thus, the function of titanium oxide can be imparted to the entire surface of the base material. Further, if ultraviolet light is selectively irradiated through a mask or the like, a titanium oxide film can be selectively formed on the surface of a cyclic olefin-based resin molded product.

(2) Since this process is a titanium oxide film forming process using an immersion method, a large-scale film forming apparatus provided with a vacuum unit as used in a dry process is not needed. Also, it is not necessary to heat the base material itself.

(3) Since the thickness of the titanium oxide film on the base material increases as the immersion time increases, it becomes possible to easily control the thickness of the titanium oxide film by controlling the immersion time. Further, since the entire surface of the base material is immersed in the mixed liquid, the distribution of the film thickness is also relatively uniform.

(4) A substance which is difficult to handle and has a safety problem such as ammonium fluorotitanate or titanium hydrofluoride is not used, and also, it is not necessary to additionally add an agent for capturing fluorine ions.

In addition, since the mixed liquid of an aqueous solution of titanium chloride and a nitrite ion-containing aqueous solution to be used in the present invention is not corrosive unlike fluorine-based solvents, even if a structure made of a metal or the like is also disposed on the base material, such a structure made of a metal or the like is not corroded.

Further, since the titanium oxide film is not formed using a hydrolysis reaction, it is not necessary to set the temperature of the solution to a higher temperature than room temperature, and thus, a problem that the uniformity of the thickness of the titanium oxide film is deteriorated due to the effect of convection flow does not occur either.

(5) The titanium oxide film formed according to the present invention has a photocatalytic function of an anatase-type titanium oxide film, and also has a property of high transparency of a rutile-type titanium oxide film, and thus, even if a titanium oxide film is formed on the surface of a transparent material according to the present invention, the transparency can be maintained.

(1) Step 0 to Step 3 and their Effects

First, treatments in the respective steps according to the present invention will be described.

In the present invention, as described above, a base material, which is a molded product composed of a cyclic olefin-based resin, is subjected to the following Step 0 to Step 3, whereby a titanium oxide film is formed on the molded product composed of a cyclic olefin-based resin.

(Step 0): A surface of a molded product composed of a cyclic olefin-based resin for fixing titanium oxide is irradiated with ultraviolet light in an oxygen-containing air atmosphere.

(Step 1): The molded product is immersed in a mixed liquid of an aqueous solution of titanium chloride and a nitrite ion-containing aqueous solution (for example, an aqueous solution of sodium nitrite).

(Step 2): After the lapse of a predetermined time, the molded product is pulled out from the mixed liquid and washed. The washing is performed with pure water (for stopping the reaction).

(Step 3): The molded product after washing is dried at room temperature.

As described above, in Step 0, a surface of a molded product composed of a cyclic olefin-based resin for fixing titanium oxide is irradiated with ultraviolet light in an oxygen-containing air atmosphere.

It was confirmed that Step 0 adopted in the present invention has two major effects on the molded product composed of a cyclic olefin-based resin.

(i) By irradiating a surface of the cyclic olefin-based resin molded product with ultraviolet light, the surface of the molded product is activated. Specifically, an olefin ring on the surface of the molded product is cleaved.

An olefin ring is formed only of a carbon bond (C—C bond), and its bond dissociation energy is 347.7 kJ/mol. Therefore, when a surface of the cyclic olefin-based resin molded product is irradiated with light having light energy larger than this bond dissociation energy, an olefin ring is cleaved on the surface of the molded product. The energy of light with a wavelength of 340 nm is about 352 kJ/mol, which is larger than the bond dissociation energy of a C—C bond. Accordingly, by irradiating a surface of the cyclic olefin-based resin molded product with light including ultraviolet light with a wavelength of 340 nm or less, an olefin ring is cleaved.

Incidentally, according to an experiment made by the present inventors, it was found that in order to reliably cleave an olefin ring, it is preferred to irradiate a surface of the molded product with light with a wavelength of 180 nm (light energy is about 664 kJ/mol) or less.

(ii) Then, oxygen is introduced on the activated surface of the molded product.

It was confirmed that by applying the subsequent Steps 1, 2, and 3, a titanium oxide film having a uniform thickness is formed only in a region where ultraviolet light is irradiated on the surface of the molded product. Here, in Step 1 in which the molded product is immersed in a mixed liquid of an aqueous solution of titanium chloride and a nitrite ion-containing aqueous solution, a heating procedure is not needed, and the step is performed at room temperature.

A mechanism of fixing titanium oxide to a base material (a molded product composed of a cyclic olefin-based resin) by the method for forming a titanium oxide film on a base material of the present invention is considered to be basically as follows.

The cleavage of an olefin ring and the introduction of oxygen in Step 0 will be described with reference to FIG. 2.

In Step 0, a molded product composed of a material containing a cyclic olefin-based resin (hereinafter, also referred to as "cyclic olefin-based resin molded product") is irradiated with light including ultraviolet light with a wavelength of 340 nm or less (specifically, vacuum ultraviolet light (also referred to as vacuum ultraviolet (VUV)) with a wavelength of 180 nm or less) ((a)→(b) of FIG. 2). By doing this, as shown in (b) and (c) of FIG. 2, an olefin ring is cleaved. It is considered that oxygen in the air is introduced at the cleavage site, and in the end, a group at the end of the cleaved olefin ring becomes a hydroxy group.

A case where a cycloolefin copolymer is used as the cyclic olefin-based resin will be described. The models shown in (s-1) and (s-2) of FIG. 2 show the results of simulation calculation of molecular structures using initial parameters for linearly polymerizing a cycloolefin copolymer. The enlarged views of the portions indicated by A in (s-1) and (s-2) are shown on the upper left side of each drawing.

Figure 2:
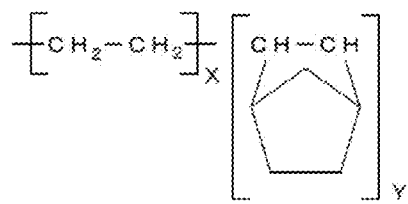
FIG. 2 is a view for explaining the cleavage of an olefin ring and the introduction of oxygen in Step 0.
Figure 2:
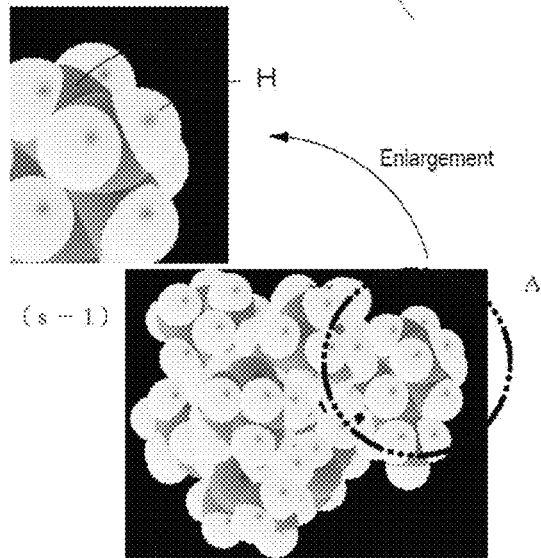
Figure 2:
Figure 2:
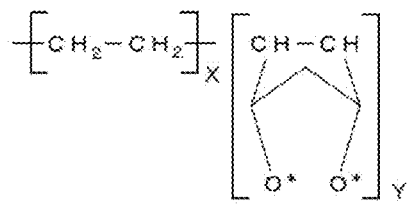
Figure 2:
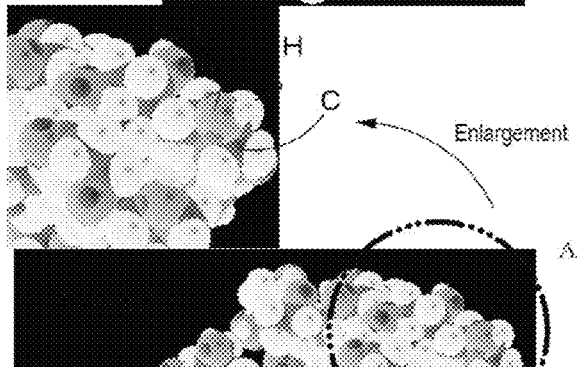
Figure 2:
Figure 2:
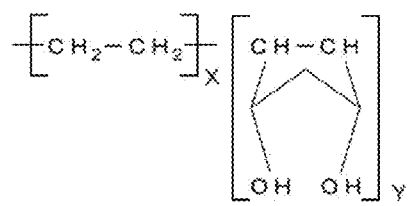
Figure 2:
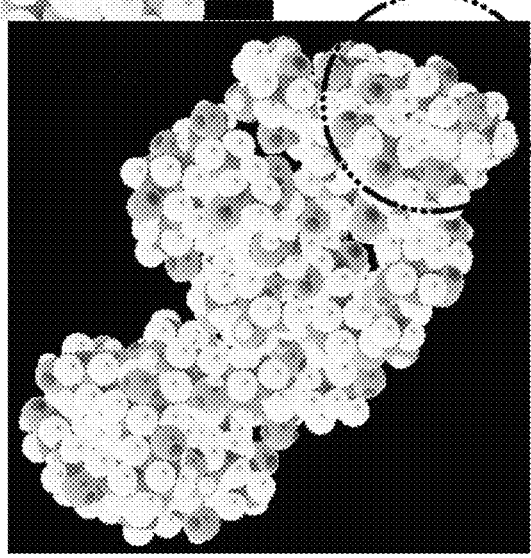

The view of (s-1) of FIG. 2 shows the simulation result of the molecular structure of the cycloolefin copolymer, and C is a carbon atom, and H is a hydrogen atom. Further, the view of (s-2) of FIG. 2 shows the simulation result of the molecular structure in a state where the olefin ring is cleaved and oxygen is introduced, and O is an oxygen atom.

The model before the olefin ring is cleaved shown in (s-1) of FIG. 2 is a calculation result when the unit represented by the chemical formula is set to 8 and polymerization is performed at 25° C. It is found that although the conditions for linear polymerization are set, the model has a molecular structure in which molecules are attracted to one another by the van der Waals force and are arranged with almost no space therebetween. That is, the linear structure turns into a bent structure due to the van der Waals force, and olefin rings are distributed such that they aggregate.

By irradiating the cyclic olefin-based resin (cycloolefin copolymer) having such a molecular structure with vacuum ultraviolet light in the air, as shown in (b) and (c) of FIG. 2, oxygen is introduced into the cyclic olefin resin. The model shown in (s-2) of FIG. 2 shows a part when the unit represented by the chemical formula is set to 60.

Next, with reference to FIG. 3 to FIG. 10, the formation of a titanium oxide film in Step 1 will be described.

Figure 3:
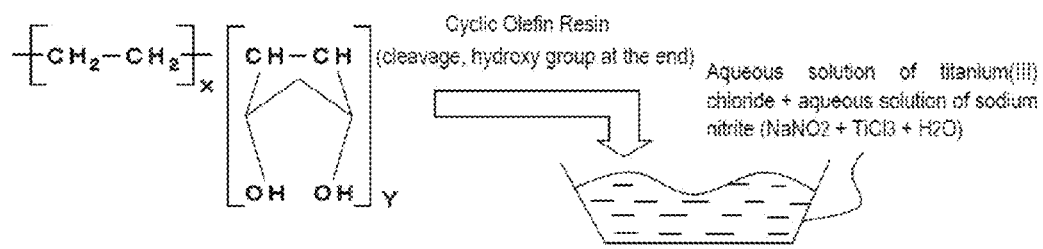
FIG. 3 is a view for explaining the formation of a titanium oxide film in Step 1 (1).
Figure 3:
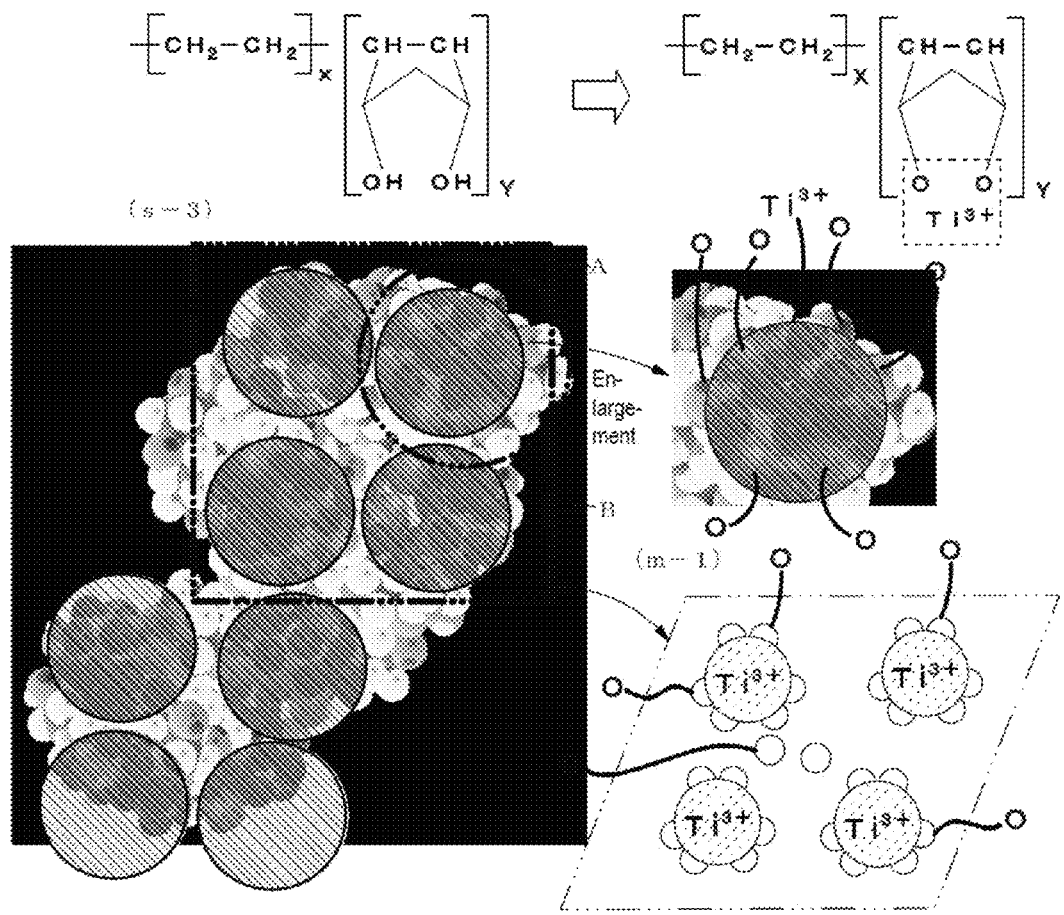

In Step 1, as shown in (a) of FIG. 3, the cyclic olefin-based resin molded product irradiated with VUV is immersed in a mixed liquid of an aqueous solution of titanium(III) chloride (aqueous solution of $TiCl_3$) and an aqueous solution of sodium nitrite (aqueous solution of $NaNO_2$). In the mixed liquid, a titanium ion ($Ti^{3+}$) and a nitrite ion ($NO^{2-}$) are contained.

As a result of the immersion, as shown in (b) of FIG. 3, hydrogen is detached from the end of a hydroxy group of the cyclic olefin-based resin molded product and oxygen and a titanium ion in the mixed liquid is bound to each other.

The radius of the titanium ion is 1.946 Å, and it is considered that an oxygen atom introduced into the cleaved olefin ring and exposed thereon and the titanium ion form a relatively tight bond.

A model view in which oxygen and a titanium ion are bound to each other is shown in (s-3) of FIG. 3, and an enlarged view of a portion indicated by A is shown on the right side of the drawing. A shaded circle in (s-3) of FIG. 3 is a titanium atom (ion).

As apparent from the model view shown in (s-3) of FIG. 3, the distribution of oxygen atoms O exposed on the surface depends on the distribution of the cleavage sites of the olefin rings due to the aggregation effect of the van der Waals force.

As shown in a schematic view of (m-1) of FIG. 3, this distribution is a distribution (corresponding to a portion indicated by B in (s-3) of FIG. 3) such that four bound titanium molecules are arrange in a rectangular shape. According to simulation, this distribution is a distribution such that it corresponds to a bond distance of titanium oxide, and that the titanium molecules are arranged in a tetragonal system with a rutile-type structure. That is, the molecular structure of a titanium oxide film formed by the method for forming a titanium oxide film of the present invention is considered to be a rutile-type structure.

As apparent from the model view of (s-3) and the schematic view of (m-1) of FIG. 3 according to the simulation, on the surface of the molded product composed of the cyclic olefin-based resin in a state where the olefin ring is cleaved by the irradiation with vacuum ultraviolet light in the air, one titanium atom forms a bond with respect to six oxygen atoms on the surface. Then, four titanium atoms form a first stage of a cubic crystal system.

Incidentally, in a rectangle formed of the four titanium atoms, two oxygen atoms are distributed.

By the immersion described above, the titanium oxide film grows as shown in FIG. 4 to FIG. 10 over time. That is, as shown in (c) of FIG. 4, [(oxidation of titanium)→(binding of titanium to oxygen)] are repeated.

Figure 4:
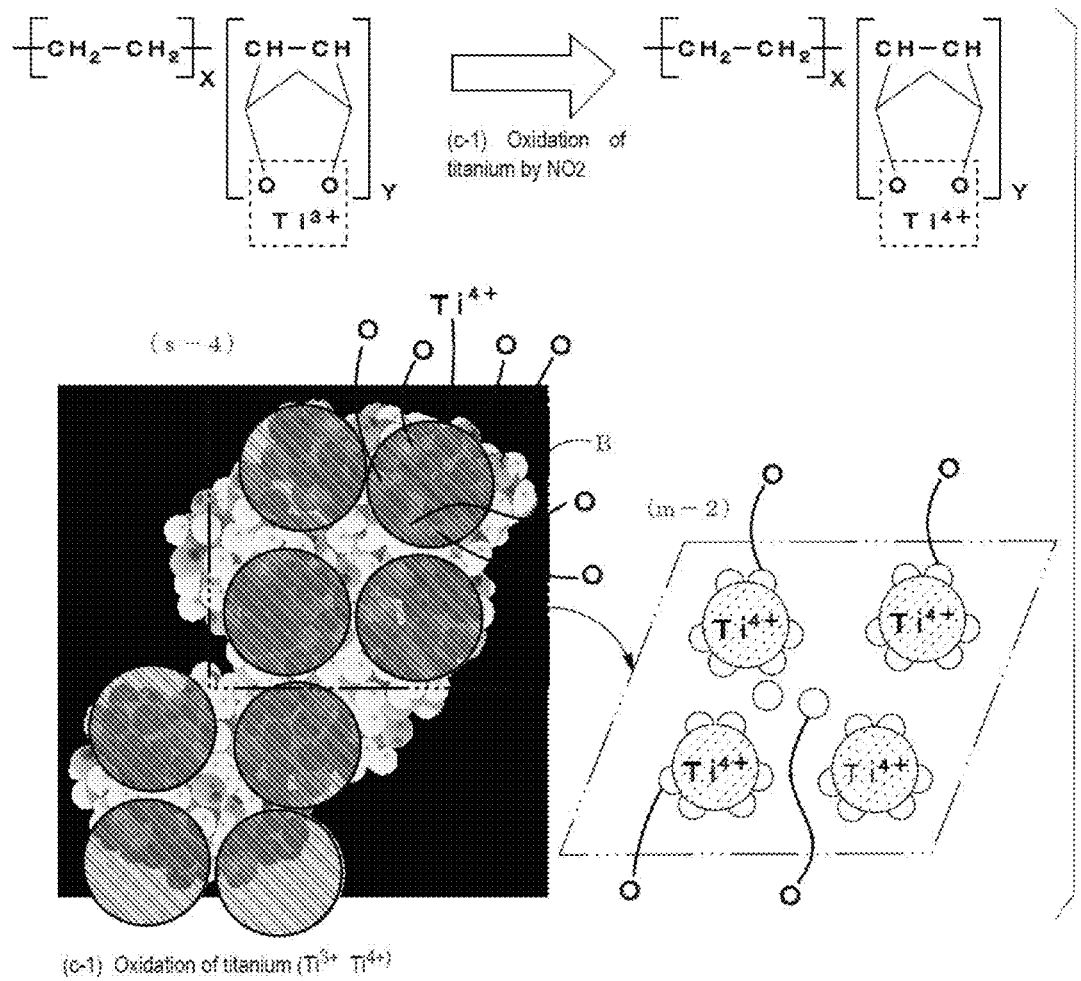
FIG. 4 is a view for explaining the formation of a titanium oxide film in Step 1 (2).

First, as shown in (c-1) of FIG. 4, a titanium ion bound to oxygen in the cyclic olefin-based resin molded product is oxidized by a nitrite ion coexisting with a titanium ion in the mixed liquid to convert $Ti^{3+}$ to $Ti^{4+}$ (see a model view of (s-4) and a schematic view of (m-2) of FIG. 4).

Figure 5:
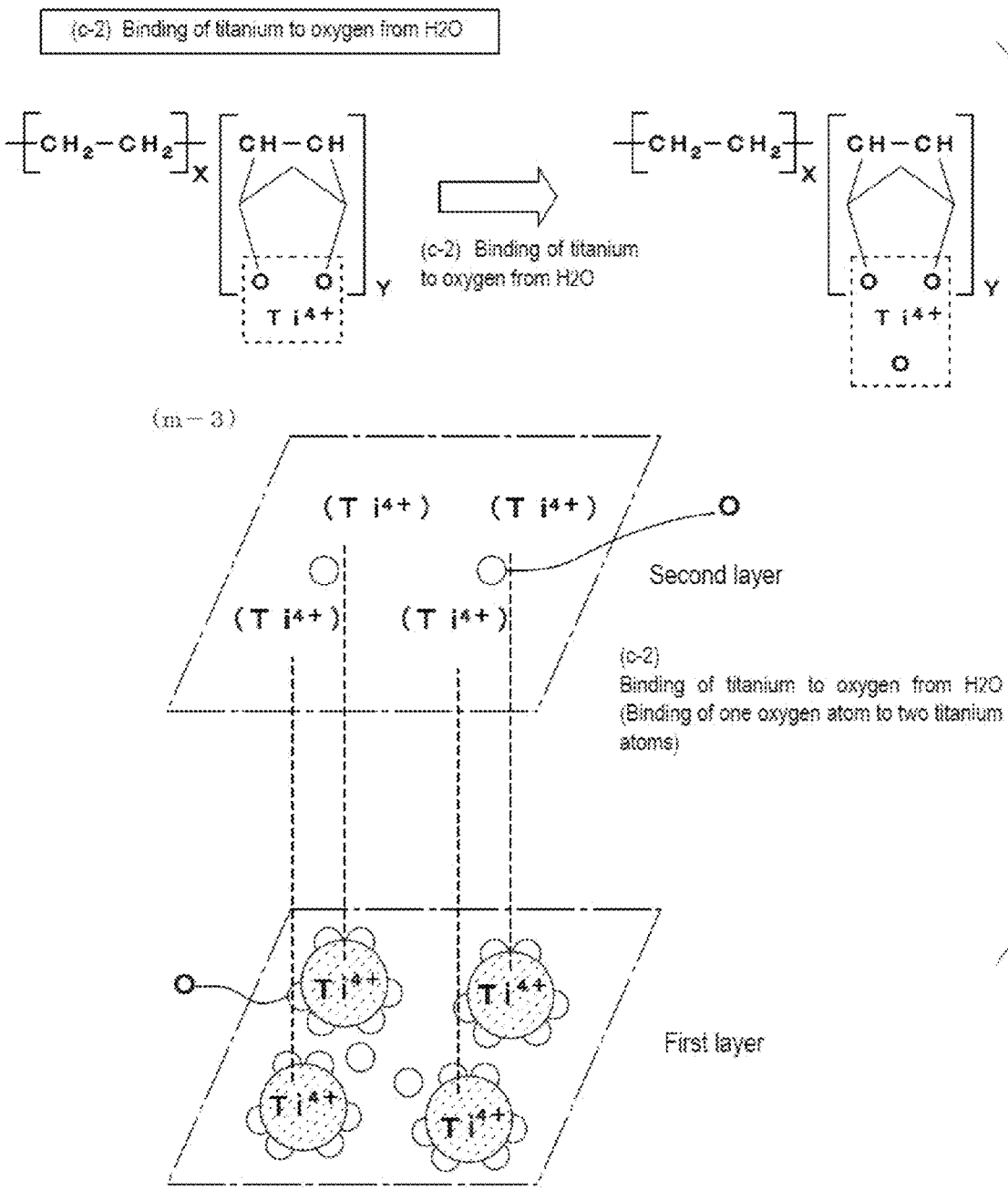
FIG. 5 is a view for explaining the formation of a titanium oxide film in Step 1 (3).

As shown in (c-2) of FIG. 5, this oxidized titanium ion is bound to oxygen supplied from water in the mixed liquid. The first stage of the cubic crystal system composed of a rectangle including four titanium atoms (titanium ions), each of which has six oxygen atoms bound thereto and two oxygen atoms distributed in this rectangle shown in the schematic view of (m-3) of FIG. 5 is called "first layer" for the sake of convenience.

The bond between the titanium ion and the oxygen atom in (c-2) of FIG. 5 is formed by binding one oxygen atom to two titanium ions in the first layer. Since there are four titanium ions in the first layer, the number of oxygen atoms bound is 2. A region where two oxygen atoms are located is called "second layer" for the sake of convenience as shown in (m-3) of FIG. 5.

Figure 6:
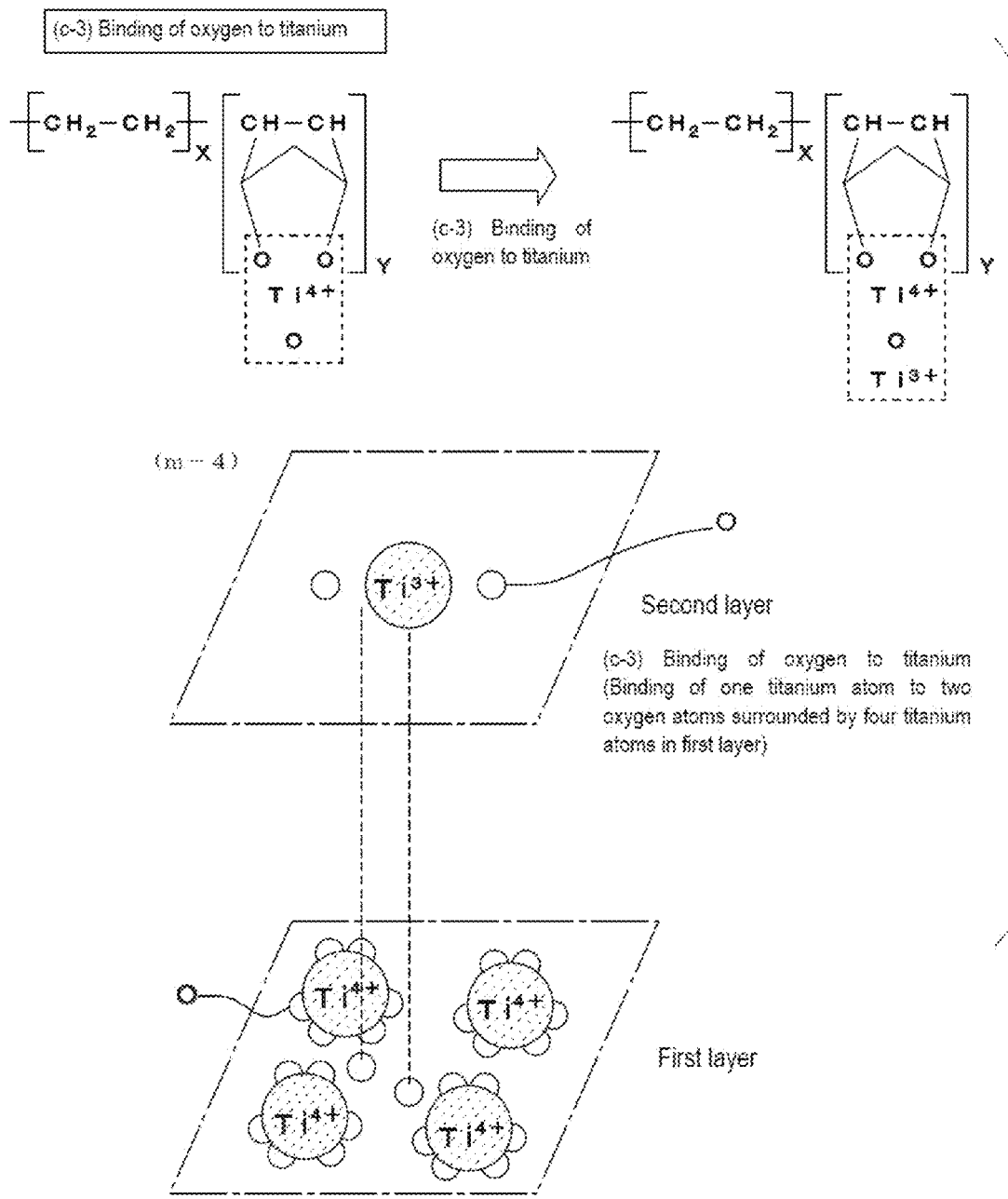
FIG. 6 is a view for explaining the formation of a titanium oxide film in Step 1 (4).

Next, as shown in (c-3) of FIG. 6, these oxygen atoms are bound to a titanium ion in the mixed liquid. More specifically, as shown in a schematic view of (m-4) of FIG. 6, the two oxygen atoms located in the first layer are bound to one titanium ion.

Figure 7:
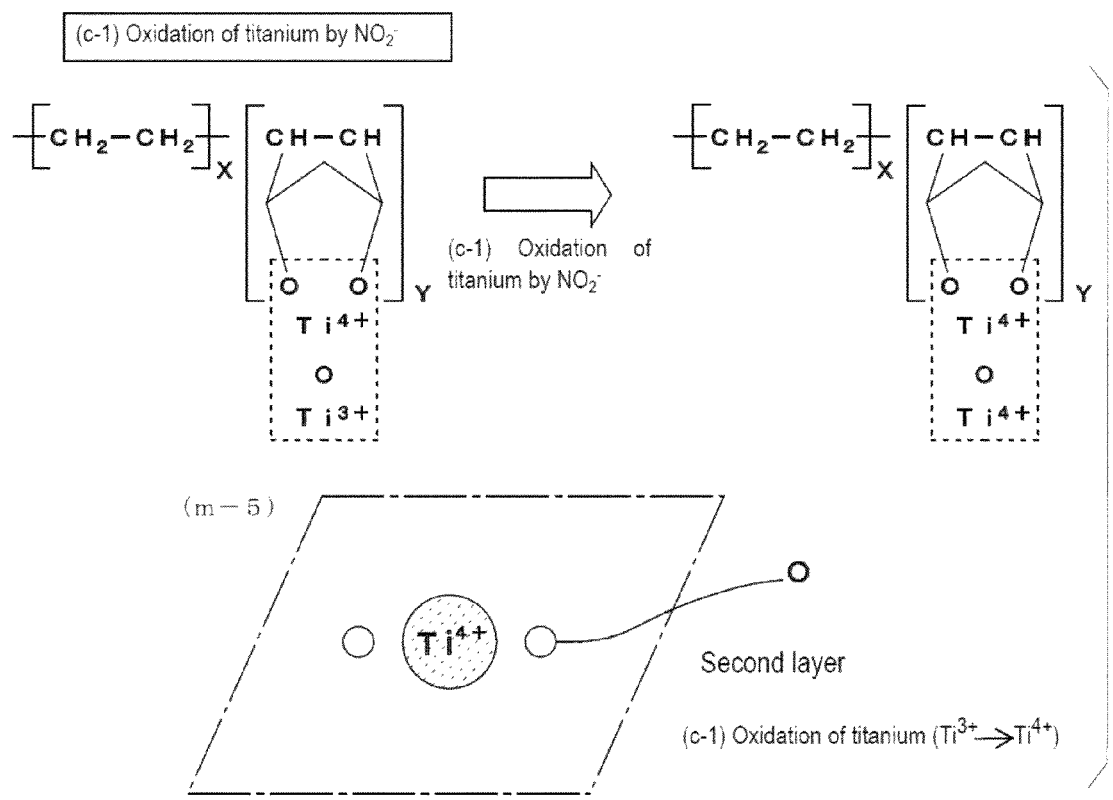
FIG. 7 is a view for explaining the formation of a titanium oxide film in Step 1 (5).

Then, as shown in (c-1) of FIG. 7 and a schematic view of (m-5) of FIG. 7, one titanium ion introduced as described above is oxidized by a nitrite ion to convert $Ti^{3+}$ to $Ti^{4+}$.

Figure 8:
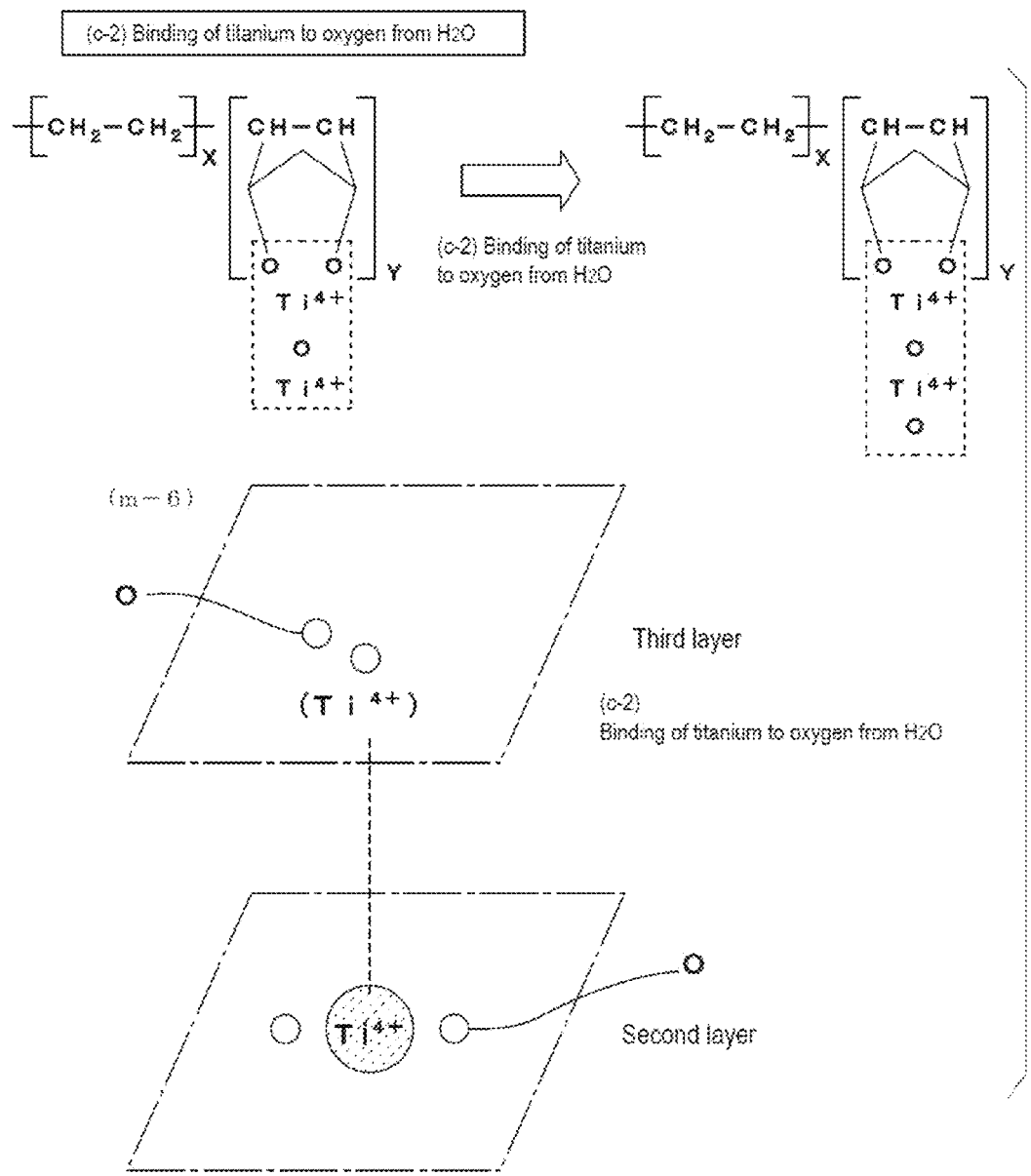
FIG. 8 is a view for explaining the formation of a titanium oxide film in Step 1 (6).

This oxidized titanium ion is bound to oxygen supplied from water in the mixed liquid as shown in (c-2) of FIG. 8.

More specifically, as shown in a schematic view of (m-6) of FIG. 8, two oxygen atoms are bound to one titanium ion in the second layer. A region where these two oxygen atoms are located is called "third layer" for the sake of convenience.

Figure 9:
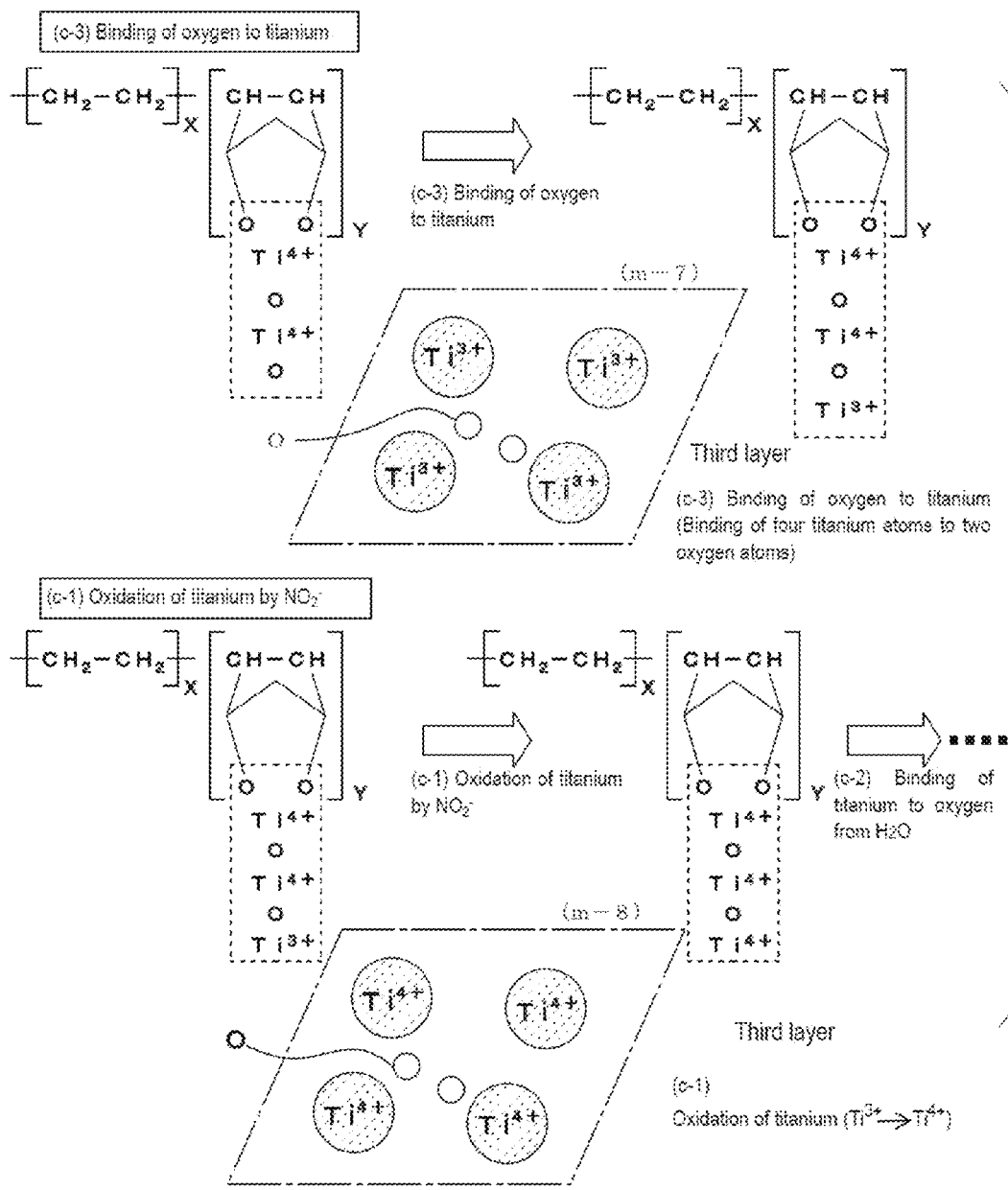
FIG. 9 is a view for explaining the formation of a titanium oxide film in Step 1 (7).

Then, as shown in (c-3) of FIG. 9, these oxygen atoms are bound to a titanium ion in the mixed liquid. More specifically, as shown in a schematic view of (m-7) of FIG. 9, the two oxygen atoms located in the third layer are bound to four titanium ions.

Then, as shown in (c-1) of FIG. 9 and a schematic view of (m-8) of FIG. 9, the four titanium ions are oxidized by a nitrite ion.

Thereafter, the above-described [(c-2) binding of the oxidized titanium ion to oxygen], [(c-3) binding of the bound oxygen to a titanium ion], and [(c-1) oxidation of a titanium ion by a nitrite ion] are carried out repeatedly.

Figure 10:
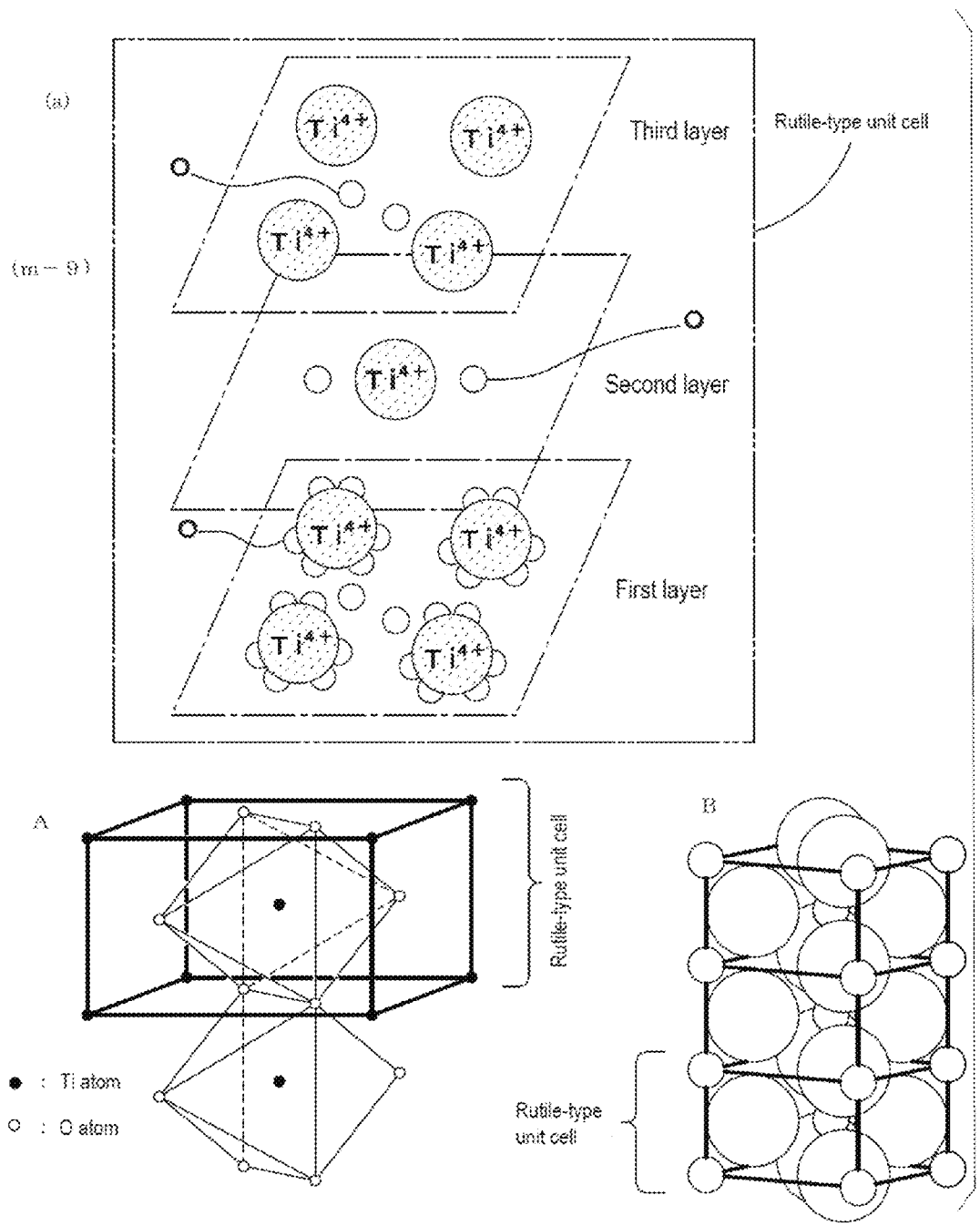
FIG. 10 is a view for explaining the formation of a titanium oxide film in Step 1 (8).

In a titanium oxide film shown in a schematic view of (m-9) of FIG. 10 which grows by stacking the first layer, the second layer, and the third layer described above in this order, a rutile-type structure is dominant as shown in A and B of FIG. 10.

Due to this, the titanium oxide film formed according to the present invention shows high transparency, absorbs almost no light in a wavelength range of 300 to 700 nm, and thus exhibits extremely high transparency.

As described above, in Step 1, it is considered that a titanium oxide film grows on the surface of the cyclic olefin-based resin molded product irradiated with VUV by repeating (c-1) oxidation of a titanium ion by a nitrite ion, (c-2) binding of the oxidized titanium ion to oxygen, and (c-3) binding of the bound oxygen to a titanium ion at the end of the cleaved olefin ring of the cyclic olefin-based resin molded product.

That is, it is considered that titanium oxide is formed according to the following reaction formula in a VUV-irradiated region on the surface of the cyclic olefin-based resin molded product immersed in the mixed liquid of an aqueous solution of titanium(III) chloride (aqueous solution of $TiCl_3$) and an aqueous solution of sodium nitrite (aqueous solution of $NaNO_2$).

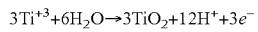

$$3Ti^{+3}+6H_2O \rightarrow 3TiO_2+12H^++3e^-$$

After the cyclic olefin-based resin molded product is immersed in the mixed liquid for a predetermined time as described above, in Step 2, the molded product is pulled out from the mixed liquid and washed with pure water or the like to stop the reaction.

The thickness of the titanium oxide film on the base material increases as the immersion time in the mixed liquid increases. However, by pulling the base material out from the mixed liquid and washing the base material, the reaction of forming the titanium oxide film is stopped. It is considered that by controlling this immersion time, the thickness of the titanium oxide film can be controlled.

In Step 3, the base material after washing is dried at room temperature.

By forming a titanium oxide film as described above, the following advantageous effects can be obtained.

(1) Since a firing step of performing heating to several hundred degrees Celsius for crystallizing titanium oxide on a base material is not needed, it becomes possible to fix titanium oxide also to a material having low thermal resistance to high temperatures (for example, a molded product containing a cyclic olefin resin).

(2) In addition, a titanium oxide film can be formed on a surface of a base material without using a binder, and thus, the function of titanium oxide can be imparted to the entire surface of the base material.

(3) Since this process is a titanium oxide film forming process using an immersion method, a large-scale film forming apparatus provided with a vacuum unit as used in a dry process is not needed. Also, it is not necessary to heat the base material itself.

(4) It is considered that a titanium oxide film is formed on a base material by repeatedly carrying out oxidation of titanium (c-1), binding of the oxidized titanium to oxygen (c-2), and binding of the bound oxygen to titanium (c-3) as described with reference to FIG. 2 to FIG. 10. That is, the thickness of the titanium oxide film on the base material increases as the immersion time increases, and therefore, by controlling the immersion time, the thickness of the titanium oxide film can be easily controlled. That is, by washing the surface with water to stop the reaction of forming the titanium oxide film as in Step 2, the thickness of the titanium oxide film is controlled. Further, since the entire surface of the base material is immersed in the mixed liquid, the distribution of the film thickness is also relatively uniform.

(5) Further, it is not necessary to use a substance which is difficult to handle and has a safety problem such as ammonium fluorotitanate or titanium hydrofluoride, and also, it is not necessary to additionally add an agent for capturing fluorine ions. In addition, since titanium oxide is not formed using a hydrolysis reaction, it is not necessary to set the temperature of the solution to a higher temperature than room temperature, and thus, a problem that the uniformity of the thickness of the titanium oxide film is deteriorated due to the effect of convection flow does not occur either.

(6) As described above, since the mixed liquid of an aqueous solution of titanium chloride and a nitrite ion-containing aqueous solution to be used in the present invention is not corrosive unlike fluorine-based solvents, even if a structure made of a metal or the like is also disposed on the base material, such a structure made of a metal or the like is not corroded.

(7) In particular, when a cyclic olefin-based resin molded product is used as the base material, a titanium oxide film is formed only in a region where ultraviolet light (preferably vacuum ultraviolet light with a wavelength of 180 nm or less) is irradiated in advance on the surface of the cyclic olefin-based resin molded product. That is, by selectively irradiating the surface of the cyclic olefin-based resin molded product with ultraviolet light through a mask or the like, a titanium oxide film can be selectively formed.

(8) The titanium oxide film formed according to the present invention has a photocatalytic function of an anatase-type titanium oxide film, and also has a property of high transparency of a rutile-type titanium oxide film, and thus, even if a titanium oxide film is formed on the surface of a transparent material, the transparency can be maintained.

(9) Further, since this process is a chemical process, a titanium oxide film can be formed also on a surface of a fine structure of a molded product (for example, a molded product composed of a porous cyclic olefin-based resin).

Specific Examples of the Invention

Hereinafter, specific embodiments of the present invention will be described in detail. However, the present invention is by no means limited to the following embodiments, and can be carried out by appropriately adding modifications within the scope of the object of the present invention. Incidentally, the description of overlapping portions is sometimes omitted as needed, but there is no intention to limit the gist of the present invention.

As an example, a case where a titanium oxide film is formed on a base material which is a molded product composed of a cyclic olefin-based resin will be described.

Cyclic Olefin-Based Resin

The cyclic olefin-based resin is a polymeric compound, in which a main chain is composed of a carbon-carbon bond, and at least a portion of the main chain has a cyclic hydrocarbon structure. This cyclic hydrocarbon structure is introduced by using, as a monomer, a compound (cyclic olefin) having at least one olefinic double bond in the cyclic hydrocarbon structure as typified by norbornene or tetracyclododecene.

The cyclic olefin-based resin (A) is classified into (1) an addition (co)polymer of a cyclic olefin or a hydrogenated product thereof, (2) an addition copolymer of a cyclic olefin with an α-olefin or a hydrogenated product thereof, and (3) a ring-opening (co)polymer of a cyclic olefin or a hydrogenated product thereof.

Specific examples of the cyclic olefin include monocyclic olefins such as cyclopentene, cyclohexene, cyclooctene, cyclopentadiene, and 1,3-cyclohexadiene;

bicyclic olefins such as bicyclo[2.2.1]hepta-2-ene (common name: norbornene), 5-methyl-bicyclo[2.2.1]hepta-2-ene, 5,5-dimethyl-bicyclo[2.2.1]hepta-2-ene, 5-ethyl-bicyclo[2.2.1]hepta-2-ene, 5-buthyl-bicyclo[2.2.1]hepta-2-ene, 5-ethylidene-bicyclo[2.2.1]hepta-2-ene, 5-hexyl-bicyclo[2.2.1]hepta-2-ene, 5-octyl-bicyclo[2.2.1]hepta-2-ene, 5-octadecyl-bicyclo[2.2.1]hepta-2-ene, 5-methylidene-bicyclo

[2.2.1]hepta-2-ene, 5-vinyl-bicyclo[2.2.1]hepta-2-ene, and 5-propenyl-bicyclo[2.2.1]hepta-2-ene;

tricyclic olefins such as tricyclo[4.3.0.12,5]deca-3,7-diene (common name: dicyclopentadiene), tricyclo[4.3.0.12,5] deca-3-ene, tricyclo[4.4.0.12,5]undeca-3,7-diene, or tricyclo [4.4.0.12,5]undeca-3,8-diene, or tricyclo[4.4.0.12,5]undeca-3-ene which is a partially hydrogenated product (or an adduct of cyclopentadiene and cyclohexene) thereof, 5-cyclopentyl-bicyclo[2.2.1]hepta-2-ene, 5-cyclohexyl-bicyclo[2.2.1] hepta-2-ene, 5-cyclohexenylbicyclo[2.2.1]hepta-2-ene and 5-phenyl-bicyclo[2.2.1]hepta-2-ene;

tetarcyclic olefins such as tetracyclo[4.4.0.12,5.17,10] dodeca-3-ene (also referred to simply as tetracyclododecene), 8-methyltetracyclo[4.4.0.12,5.17,10]dodeca-3-ene, 8-ethyltetracyclo[4.4.0.12,5.17,10]dodeca-3-ene, 8-methylidenetetracyclo[4.4.0.12,5.17,10]dodeca-3-ene, 8-ethylidenetetracyclo[4.4.0.12,5.17,10]dodeca-3-ene, 8-vinyltetracyclo[4.4.0.12,5.17,10]dodeca-3-ene, and 8-propenyl-tetracyclo[4.4.0.12,5.17,10]dodeca-3-ene; and polycyclic olefins such as 8-cyclopentyl-tetracyclo [4.4.0.12,5.17,10]dodeca-3-ene, 8-cyclohexyl-tetracyclo [4.4.0.12,5.17,10]dodeca-3-ene, 8-cyclohexenyl-tetracyclo [4.4.0.12,5.17,10]dodeca-3-ene, 8-phenyl-cyclopentyl-tetracyclo[4.4.0.12,5.17,10]dodeca-3-ene, tetracyclo[7.4.13, 6.01,9.02,7]tetradeca-4,9,11,13-tetraene (also referred to as 1,4-methano-1,4,4a,9a-tetrahydrofluorene), tetracyclo[8.4.14,7.01,10.03,8]pentadeca-5,10,12,14-tetraene (also referred to as 1,4-methano-1,4,4a,5,10,10a-hexahydroanthracene), pentacyclo[6.6.1.13,6.02,7.09,14]-4-hexadecene, pentacyclo[6.5.1.13,6.02,7.09,13]-4-pentadecene, pentacyclo[7.4.0.02,7.13,6.110,13]-4-pentadecene, heptacyclo[8.7.0.12,9.14,7.111, 7.03,8.012,16]-5-eicosene, heptacyclo[8.7.0.12,9.03,8.14,7.012,17.113,16]-14-eicosene, and a tetramer of cyclopentadiene. These cyclic olefins can be used alone or in combination of two or more types thereof.

Specific examples of the α-olefin copolymerizable with a cyclic olefin include α-olefins having 2 to 20 carbon atoms, preferably 2 to 8 carbon atoms such as ethylene, propylene, 1-butene, 1-pentene, 1-hexene, 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, 1-octene, 1-decene, 1-dodecene, 1-tetradecene, 1-hexadecene, 1-octadecene, and 1-eicosene. These α-olefins may be used alone or in combination of two or more types thereof.

A method for polymerizing a cyclic olefin or a cyclic olefin and an α-olefin, and a method for hydrogenating an obtained polymer are not particularly limited, and the polymerization or the hydrogenation can be performed according to a known method.

The cyclic olefin-based resin is preferably an addition copolymer of ethylene with norbornene or an addition copolymer of ethylene with tetracyclododecene.

The structure of the cyclic olefin-based resin is not particularly limited, and may be linear, branched, or crosslinked, but is preferably linear.

Further, it is also possible to use a commercially available resin as the cyclic olefin-based resin containing a cyclic olefin component as a polymerization component to be used in the present invention. Examples of the commercially available cyclic olefin-based resin include TOPAS (registered trademark, manufactured by TOPAS Advanced Polymers, Inc.), Apel (registered trademark, manufactured by Mitsui Chemicals, Inc.), ZEONEX (registered trademark, manufactured by ZEON Corporation), ZEONOR (registered trademark, manufactured by ZEON Corporation), and ARTON (registered trademark, manufactured by JSR Corporation).

Other Components

In the present invention, the cyclic olefin-based resin may be used as a composition in which another thermoplastic resin is blended within a range in which the type and the amount thereof do not inhibit the object of the present invention. Such a resin composition composed of the cyclic olefin-based resin and another thermoplastic resin can be prepared by, for example, melt-kneading the resins using a single-screw extruder, a twin-screw extruder, or the like.

In the present invention, as the cyclic olefin-based resin, a resin containing various additives such as an antioxidant, a weather resistance stabilizer, an ultraviolet absorbent, an antibacterial agent, a flame retardant, and a colorant within a range in which the types and the amounts thereof do not inhibit the object of the present invention may be used. In the case where the cyclic olefin-based resin contains such an additive, for example, the preparation can be achieved by melt-kneading the cyclic olefin-based resin and the additive using a single-screw extruder, a twin-screw extruder, or the like.

Molded Product

The molded product composed of a cyclic olefin-based resin is produced by molding the above-described cyclic olefin-based resin using a known method. Examples of the known molding method include injection molding, injection compression molding, gas assist injection molding, extrusion molding, multi-layer extrusion molding, rotational molding, heat-press molding, blow molding, and foam molding.

The shape of the molded product composed of a cyclic olefin-based resin is not particularly limited. For example, the molded product may be a general-purpose product such as a film, a sheet, a tube, a pipe, or a bottle, and also may be a molded product designed according to a specific application such as a plastic substrate for use in a microflow device.

Hereinafter, with respect to the embodiments of the present invention, (a) Step 0, in which a surface of a cyclic olefin-based resin molded product is irradiated with ultraviolet light to activate the surface of the molded product, and (b) Steps 1, 2, and 3, in which the molded product (base material) subjected to a surface treatment in Step 0 is immersed in a mixed liquid of an aqueous solution of titanium chloride and an aqueous solution of sodium nitrite which is a nitrite ion-containing aqueous solution, after the lapse of a predetermined time, the base material is pulled out from the mixed liquid and washed, and then, the base material after washing is dried at room temperature will be sequentially described.

Step 0

Step 0 is a step in which a surface of a cyclic olefin-based resin molded product is irradiated with vacuum ultraviolet light. By the irradiation of the surface with ultraviolet light, the surface is activated.

As a light source, for example, an excimer lamp which emits vacuum ultraviolet light with a center wavelength of 172 nm is used.

Figure 11:
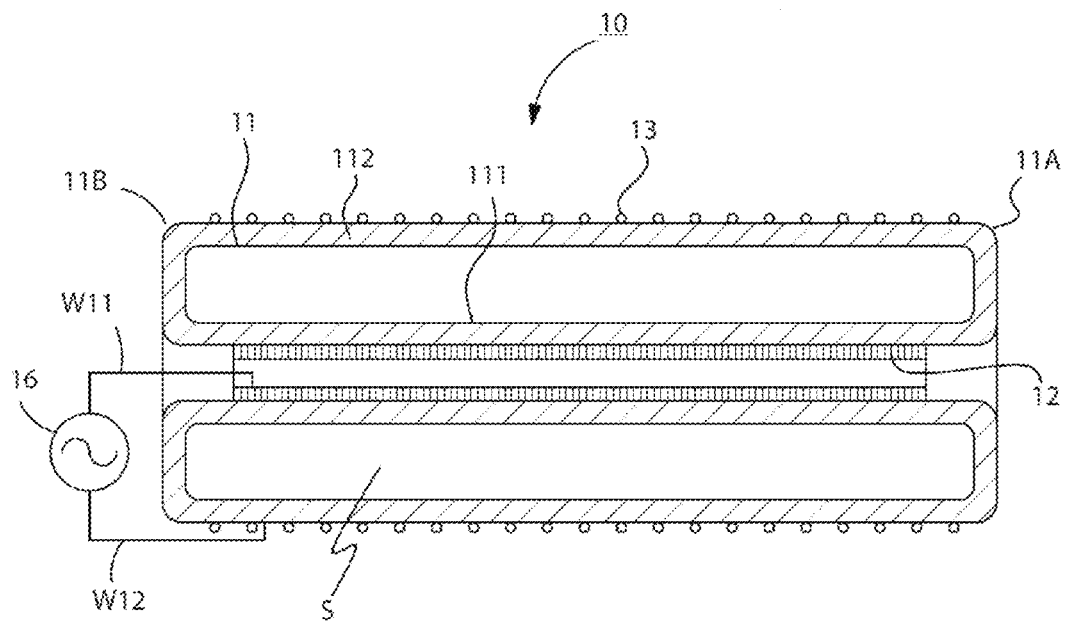
FIG. 11 is a view showing a structural example of an excimer lamp.

FIG. 11 is a view showing a structural example of the excimer lamp. The excimer lamp has a tubular structure, and FIG. 11 shows a cross-sectional view taken along a plane including the tube axis. An excimer lamp 10 has a vessel (arc tube) 11 having a substantially double-tube structure in which an inner tube 111 and an outer tube 112 are substantially concentrically arranged, and by sealing both end portions 11A and 11B of this vessel 11, a cylindrical discharge space S is formed therein. In the discharge space S, a rare gas such as xenon, argon, or krypton is entrapped. The vessel 11 is made of quartz glass. On an inner peripheral surface of the inner tube 111, an inner electrode 12 is provided, and an outer peripheral surface of the outer tube 112, a grid-shaped outer electrode 13 is provided. These electrodes 12 and 13 are disposed with the vessel 11 and the discharge space S interposed therebetween. To the electrodes 12 and 13, a power supply 16 is connected through lead wires W11 and W12. When a high-frequency voltage is applied by the power supply 16, electric discharge (so-called dielectric barrier discharge) with dielectric bodies (111 and 112) interposed between the electrodes 12 and 13 is formed, and in the case of xenon gas, vacuum ultraviolet light with a center wavelength of 172 nm is generated, and the vacuum ultraviolet light is emitted to the outside.

Figure 12:
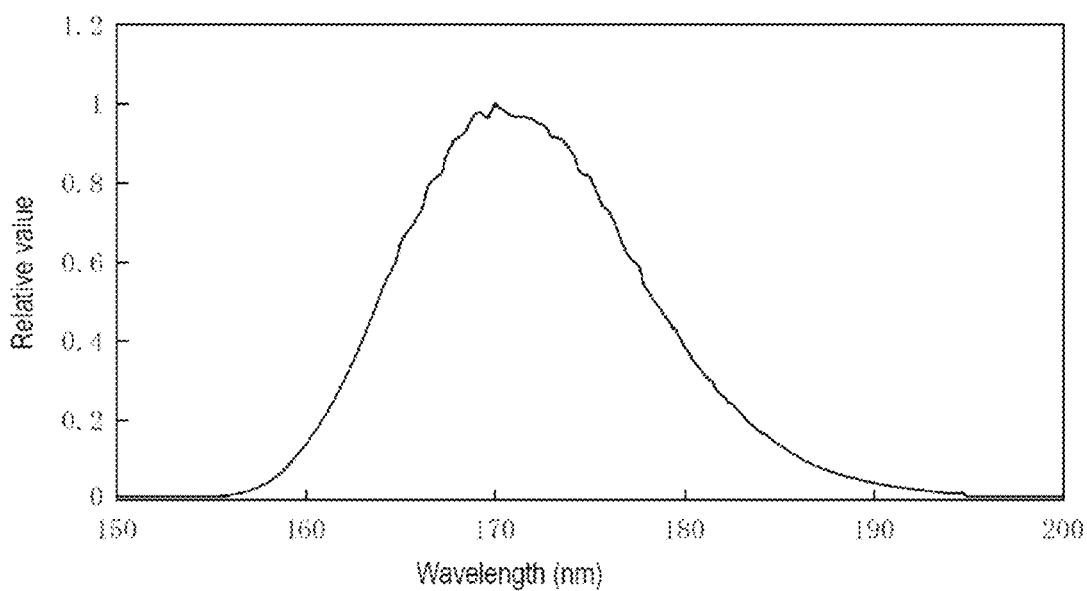
FIG. 12 is a graph showing the radiation wavelength distribution of an excimer lamp.

FIG. 12 shows a radiation wavelength distribution when the excimer lamp 10 shown in FIG. 11 was turned on at a frequency of 20 KHz and a bulb wall loading of 0.1 W/cm$^2$. The abscissa represents a radiation wavelength, and the ordinate represents a relative value to the intensity of light with a wavelength of 170 nm.

Figure 13:
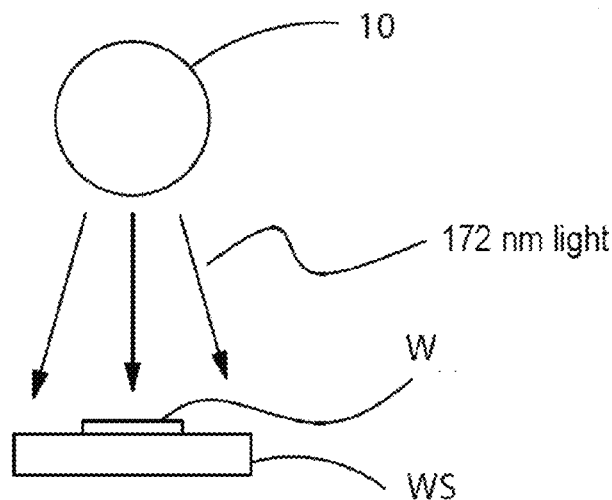
FIG. 13 is a schematic view of an experimental system in which a base material is irradiated with vacuum ultraviolet light from an excimer lamp.

FIG. 13 shows a schematic view of an experimental system. As shown in FIG. 13, a base material W on a work stage WS was irradiated with vacuum ultraviolet light from an excimer lamp 10. As the excimer lamp 10, an excimer lamp which emits vacuum ultraviolet light with a center wavelength of 172 nm as described above was used, and an irradiance on the surface of a sample was 20 mW/cm$^2$.

The sample was a molded product obtained by molding using TOPAS 8007S-04 (manufactured by Polyplastics Co., Ltd.) as the cyclic olefin-based resin, and was a substrate whose shape was a square with a thickness of 10 mm, a length of 100 mm, and a width of 100 mm.

The surface of the cyclic olefin-based resin molded product used as the sample was irradiated with vacuum ultraviolet light under the above-described conditions, and the surface state of the molded product was examined. More specifically, by using an X-ray photoelectron spectroscope (XPS), XPS-7000 manufactured by Rigaku Corporation, measurement by XPS (X-ray photoelectron spectroscopy) was performed for the surface of the cyclic olefin-based resin molded product before and after the vacuum ultraviolet light irradiation treatment.

Figure 14:
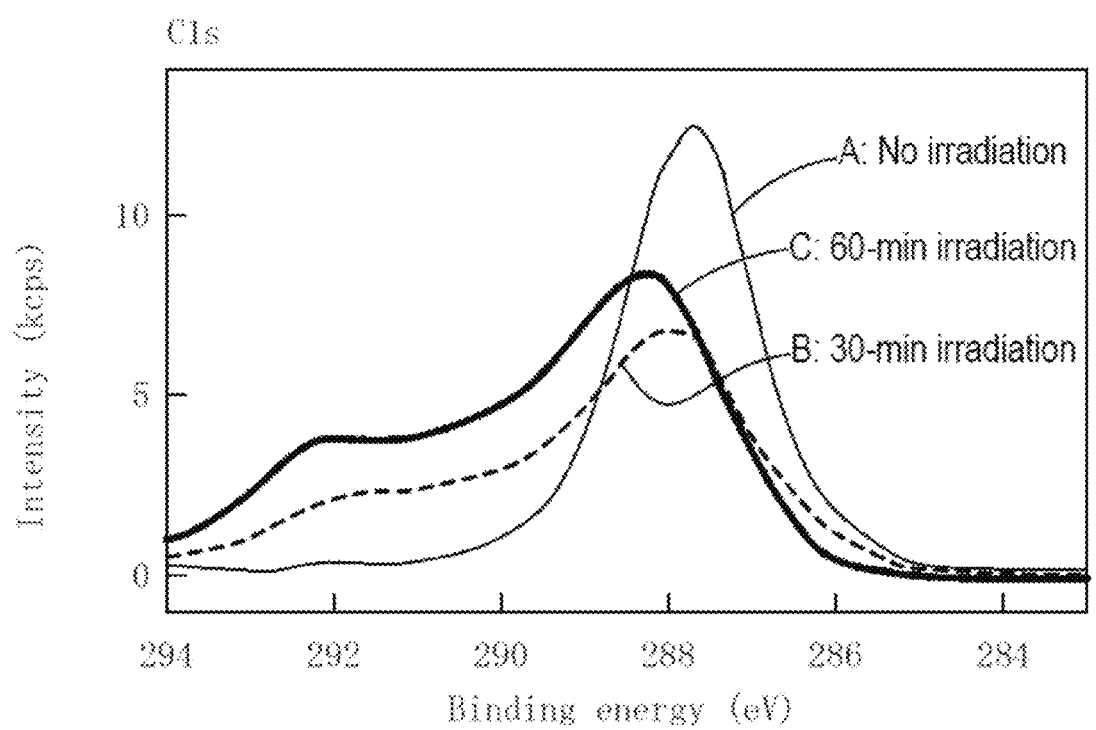
FIG. 14 is a graph showing the results of XPS measurement with respect to the C1s peak of carbon in samples subjected to Step 0.
Figure 15:
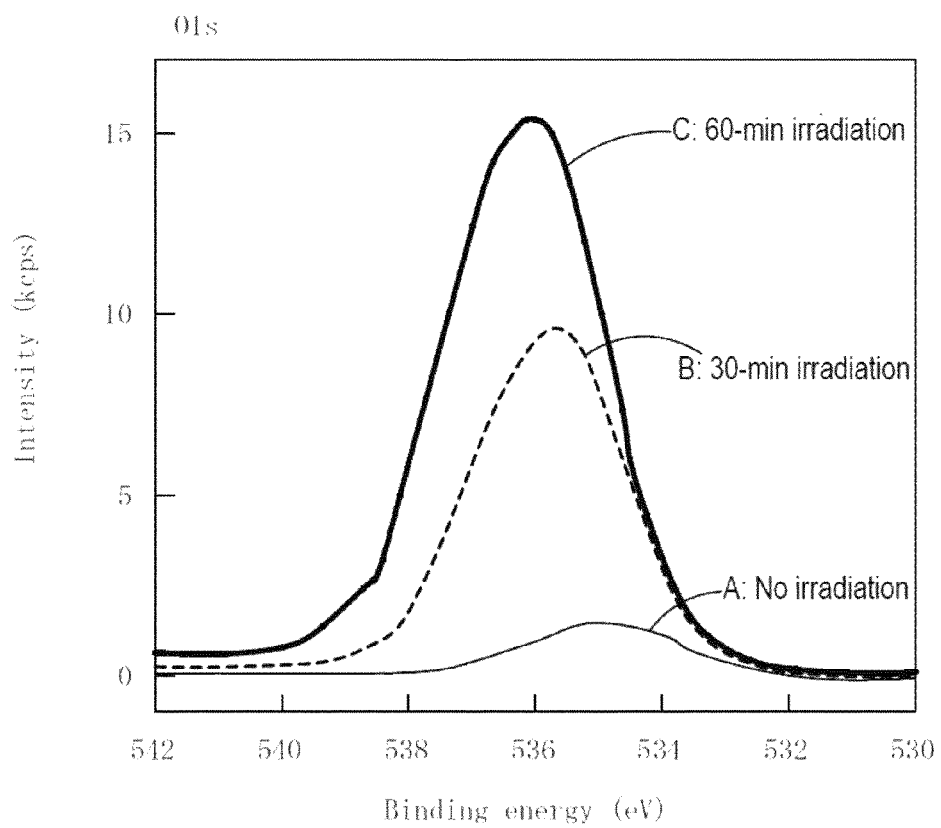
FIG. 15 is a graph showing the results of XPS measurement with respect to the O1s peak of oxygen in samples subjected to Step 0.

The results of the XPS measurement are shown in FIGS. 14 and 15, respectively. In FIGS. 14 and 15, the abscissa represents a binding energy (eV), and the ordinate represents a photoelectron intensity (arbitrary unit). Here, FIG. 14 shows the measurement results with respect to the C1s peak of carbon, and FIG. 15 shows the measurement results with respect to the O1s peak of oxygen.

As shown in FIGS. 14 and 15, the XPS measurement was performed before irradiation with vacuum ultraviolet light having a center wavelength of 172 nm, after 30-minute irradiation, and after 60-minute irradiation.

In the measurement of C1s shown in FIG. 14, one structural peak considered to be derived from epoxy was observed in the case of the molded product before irradiation with vacuum ultraviolet light. Further, when the surface of the molded product was irradiated with vacuum ultraviolet light for 30 minutes and 60 minutes, the one carbon peak observed in the case of the molded product before irradiation with vacuum ultraviolet light was divided into two. It is considered that this is because by irradiating the surface of the cyclic olefin-based resin molded product with vacuum ultraviolet light, the olefin ring was cleaved.

On the other hand, in the measurement of O1s shown in FIG. 15, an oxygen peak was observed in the case of the molded product before irradiation with vacuum ultraviolet light. Since the structure of the cyclic olefin resin itself does not contain oxygen, it is considered that the surface of the cyclic olefin-based resin molded product was covered with only a small amount of an oxide film from the beginning.

Further, when the surface of the molded product was irradiated with vacuum ultraviolet light for 30 minutes and 60 minutes, the one oxygen peak observed in the case of the molded product before irradiation with vacuum ultraviolet light increased significantly. That is, it was proved that when a surface of a molded product composed of a cyclic olefin-based resin is irradiated with vacuum ultraviolet light in the air, oxygen is introduced on the surface.

By summarizing the above results, a treatment of a surface of a cyclic olefin-based resin molded product in Step 0 in which a surface of a cyclic olefin-based resin molded product is irradiated with ultraviolet light (vacuum ultraviolet light) causes activation of the surface and introduction of oxygen on the activated surface. From the results of the XPS measurement, it is considered that according to Step 0, as the activation of the surface, specifically, the olefin ring on the surface is cleaved, and also oxygen is introduced on the surface.

Step 1, Step 2, and Step 3

Next, Steps 1, 2, and 3 will be described.

Step 1 is a step in which the base material which is the cyclic olefin-based resin molded product having a surface irradiated with ultraviolet light (vacuum ultraviolet light) in Step 0 is immersed in a mixed liquid of an aqueous solution of titanium chloride and a nitrite ion-containing aqueous solution. Step 2 is a step in which after the lapse of a predetermined time, the base material is pulled out from the mixed liquid and washed, and Step 3 is a step in which the base material after washing is dried at room temperature.

The base material used is a molded product obtained by molding using TOPAS 8007S-04 (manufactured by Polyplastics Co., Ltd.) as the cyclic olefin-based resin and is a substrate whose shape is a square with a thickness of 2 mm, a length of 8 mm, and a width of 8 mm.

This base material was irradiated with vacuum ultraviolet light from an excimer lamp which emits vacuum ultraviolet light with a center wavelength of 172 nm for 60 minutes. An irradiance on the surface of the base material was 4 to 5 mW/cm$^2$ or less.

Subsequently, as Steps 1, 2, and 3, the above base material was immersed in a mixed liquid of an aqueous solution of titanium(III) chloride having a titanium(III) chloride concentration of 20% to 10 mM and an aqueous solution of sodium nitrite having a sodium nitrite concentration of 0.1 M. As the mixed liquid in which the base material was immersed, three types of mixed liquids in which the hydrogen-ion exponent was adjusted as follows: pH=7, pH=8.5, and pH=10 were used. Incidentally, the adjustment of the pH to 8.5 was performed by introducing calcium acetate into the mixed liquid. In the same manner, the adjustment of the pH to 10.0 was performed by introducing calcium acetate and sodium hydroxide into the mixed liquid. After the lapse of 30 minutes from the initiation of immersion, the base material was pulled out from the mixed liquid, washed with pure water, and then dried at room temperature.

In order to examine the state of the surface of the sample subjected to Steps 1, 2, and 3, in the same manner as described above, by using an X-ray photoelectron spectroscope (XPS), XPS-7000 manufactured by Rigaku Corporation, XPS measurement was performed for the surface.

Figure 16:
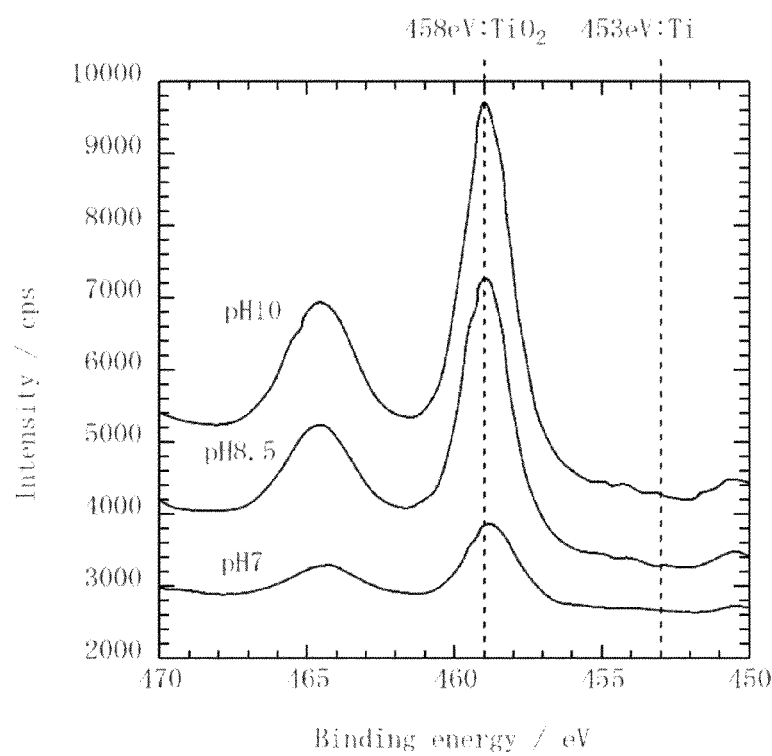
FIG. 16 is a graph showing the results of XPS measurement with respect to titanium oxide in samples subjected to the treatments in Step 0 to Step 3 using three types of mixed liquids.

The results of the XPS measurement are shown in FIG. 16. In any of the cases of the base materials immersed in the mixed liquids at the respective pH values, a peak at around 453 eV attributed to titanium (Ti) was not observed, but a peak at around 458 eV attributed to titanium oxide (TiO$_2$) was observed. From these results, it was confirmed that what was fixed to the surface of each of the base materials was titanium oxide.

That is, by performing the treatments in Steps 1, 2, and 3, a titanium oxide film was formed on the surface of the molded product composed of the cyclic olefin-based resin subjected to the treatment in Step 0.

Crystal Structure

Subsequently, the structure of the titanium oxide film formed on the surface of the cyclic olefin-based resin molded product through the treatments in Step 0 to Step 3 using each of the above-described three types of mixed liquids was evaluated. More specifically, measurement by Raman spectroscopy was performed using a Raman spectroscope (model RMP-200) manufactured by JASCO Corporation.

Figure 17A:
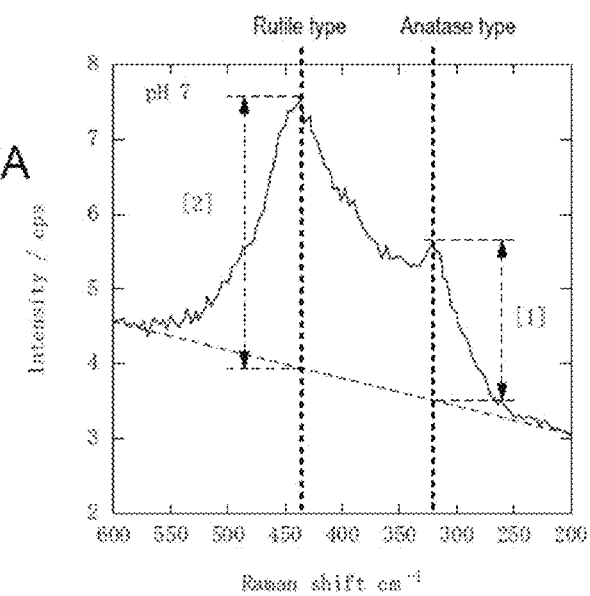
FIGS. 17A to 17C are graphs showing the results of Raman spectroscopy of samples subjected to the treatments in Step 0 to Step 3 using three types of mixed liquids.
Figure 17B:
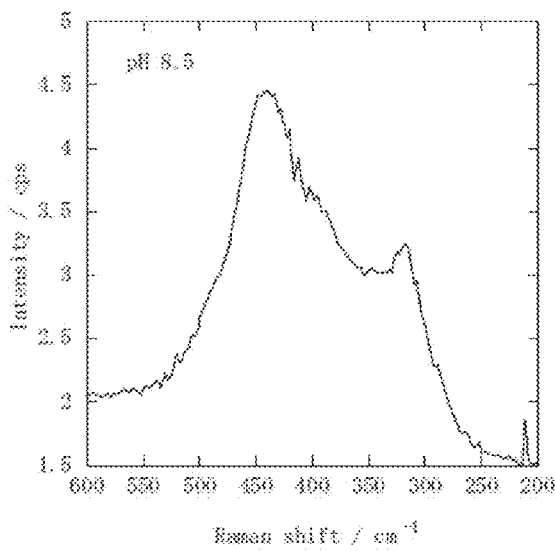
Figure 17C:
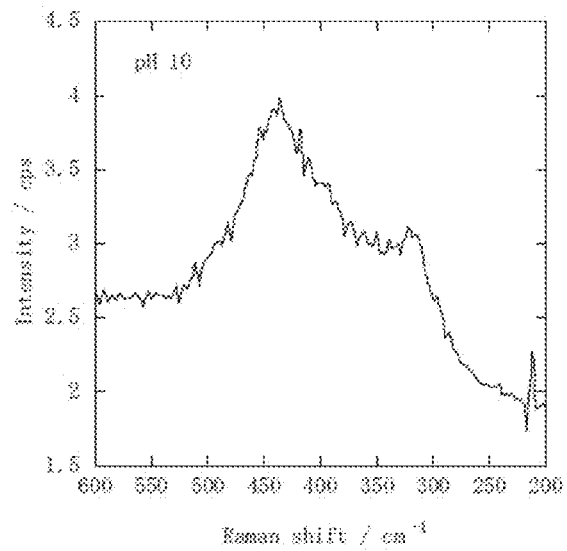

The results of the measurement by Raman spectroscopy are shown in FIGS. 17A to 17C. In each of FIGS. 17A to 17C, the abscissa represents a Raman shift ($cm^{-1}$), and the ordinate represents a Raman intensity (arbitrary unit).

As apparent from FIGS. 17A to 17C, there is a peak in a Raman shift range of 400 to 450 $cm^{-1}$, and also there is another peak in a Raman shift range of 300 to 350 $cm^{-1}$. The former peak corresponds to rutile-type titanium oxide, and the latter peak corresponds to anatase-type titanium oxide. That is, it is found that titanium oxide formed on the surface of the cyclic olefin-based resin molded product according to this embodiment is a mixture of rutile type and anatase type. Further, as apparent from FIG. 17A, from the results of Raman spectroscopy using the mixed liquid at pH 7, the structural ratio of rutile-type titanium oxide to anatase-type titanium oxide was found to be about 2:1.

Further, as apparent from FIGS. 17B and 17C, it was found that when the pH of the mixed liquid is in a range of 7 to 10, a titanium oxide film in which the compositional ratio of the rutile type to the anatase type is the same is formed.

The reason why titanium oxide has a mixed crystal structure in the titanium oxide film formed on the surface of the cyclic olefin-based resin molded product using the method for forming a titanium oxide film of the present invention is not entirely clear, but it is considered to be due to the following mechanism.

It is considered that the crystal structure of titanium oxide formed on the base material is determined according to the position of oxygen present on the surface of the base material.

As previously described, in Step 0, when the cyclic olefin-based resin molded product is irradiated with ultraviolet light (preferably vacuum ultraviolet light), as shown in FIG. 2, an olefin ring is cleaved, and oxygen is introduced at the cleavage site of the cleaved olefin ring. The titanium oxide film formed on the surface of the cyclic olefin-based resin molded product has a crystal structure in which a distance between the adjacent oxygen atoms introduced into the cleaved olefin ring and a lattice constant are substantially the same. According to the above-described simulation results, the crystal structure of titanium oxide growing on the cyclic olefin-based resin molded product is rutile type.

Here, the cyclic olefin-based resin which is a polymeric compound has a structure in which the constitutional elements such as an olefin ring are not arranged orderly, but are arranged randomly. Due to this, the following presumption can be made. Oxygen atoms introduced into each of the cleaved olefin rings are not in an orderly arranged state, but are in a randomly arranged state. Then, on the surface of the cyclic olefin-based resin molded product irradiated with ultraviolet light, rutile-type titanium oxide is formed in a region where a distance of adjacent oxygen atoms among the oxygen atoms arranged randomly is substantially the same as the lattice constant of rutile-type titanium oxide, and anatase-type titanium oxide is formed in a region where a distance of adjacent oxygen atoms among the oxygen atoms arranged randomly is substantially the same as the lattice constant of anatase-type titanium oxide.

That is, it is considered that the surface of the cyclic olefin-based resin molded product has a structure in which a plurality of domains are randomly arranged, and a titanium oxide film growing in each domain is rutile type, and a portion of the titanium oxide film growing across the boundary between the domains is anatase type.

As a result, in the titanium oxide film formed on the surface of the cyclic olefin-based resin molded product, rutile-type titanium oxide and anatase-type titanium oxide are mixed.

Hydrophilicity

Subsequently, a contact angle of the surface having a titanium oxide film formed thereon of each molded product was measured for three types of cyclic olefin-based resin molded products subjected to the treatments in Step 0 to Step 3 using each of the above-described three types of mixed liquids so as to form a titanium oxide film on the surfaces of the cyclic olefin-based resin molded products. As Comparative Example, a contact angle of the surface of the cyclic olefin-based resin molded product before forming the titanium oxide film on the surface thereof was measured. As a liquid used in the measurement of the contact angle, water was adopted.

The contact angle of the surface of the cyclic olefin-based resin molded product before forming the titanium oxide film on the surface thereof was about 60°. On the other hand, the contact angles of the surfaces having a titanium oxide film formed thereon of the three types of cyclic olefin-based resin molded products were all less than 10°. That is, when a titanium oxide film is formed on the surface of the cyclic olefin-based resin molded product using the method for forming a titanium oxide film of the present invention, the surface having the titanium oxide film formed thereon becomes a hydrophilic surface.

Absorbance

The characteristics of wavelength of absorbance were examined for three types of cyclic olefin-based resin molded products subjected to the treatments in Step 0 to Step 3 using each of the above-described three types of mixed liquids so as to form a titanium oxide film on the surfaces of the cyclic olefin-based resin molded products. As Comparative Example, characteristics of wavelength of absorbance were examined for the cyclic olefin-based resin molded product before forming the titanium oxide film on the surface thereof.

In the measurement, an absorption spectrophotometer (model U-3310) manufactured by Hitachi High-Technologies Corporation was used.

Figure 18A:
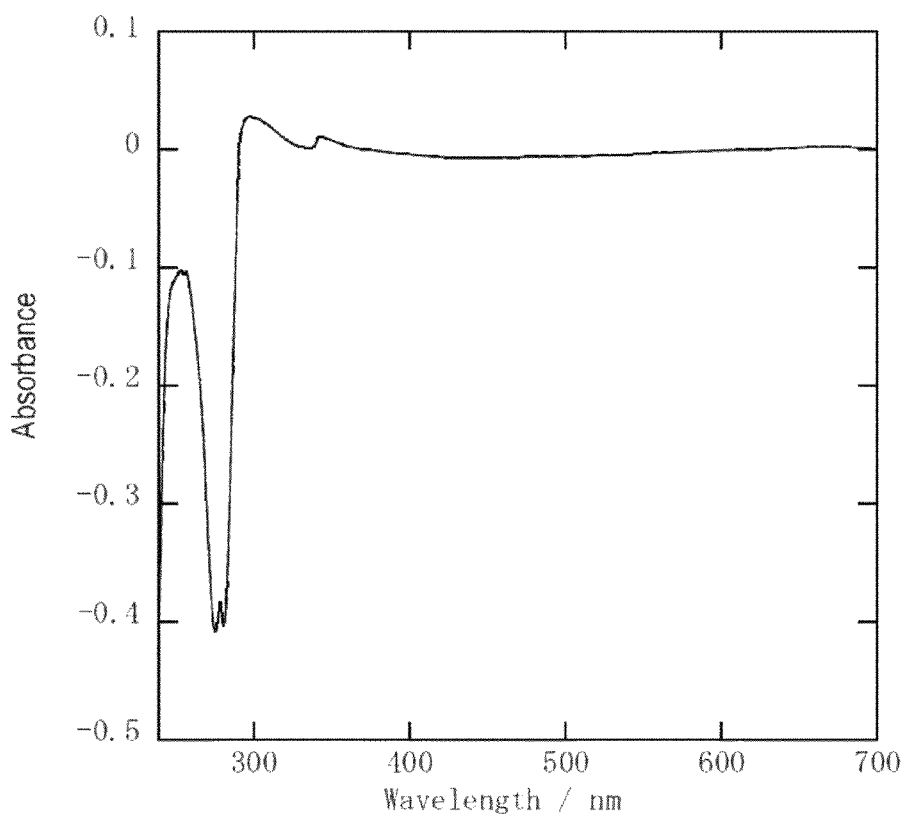
FIGS. 18A and 18B are graphs showing the characteristics of wavelength of absorbance of a cyclic olefin-based resin molded product subjected to Step 1, Step 2, and Step 3 and the cyclic olefin-based resin molded product before forming a titanium oxide film.
Figure 18B:
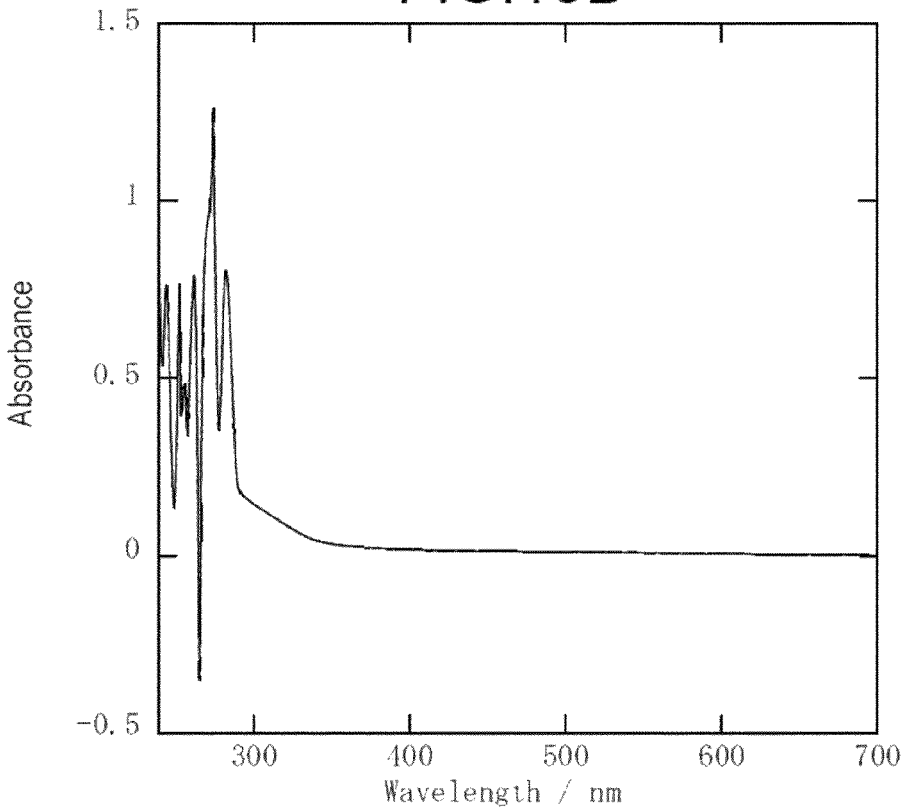

The results are shown in FIGS. 18A and 18B. As shown in FIG. 18B, the cyclic olefin-based resin molded product before forming the titanium oxide film on the surface thereof hardly absorbed light in a wavelength range of 300 to 700 nm. Further, as shown in FIG. 18A, all the three types of cyclic olefin-based resin molded products hardly absorbed light in a wavelength range of 300 to 700 nm in the same manner as the cyclic olefin-based resin molded product before forming the titanium oxide film on the surface thereof, and exhibited extremely high transparency.

It is known that in general, titanium oxide exhibits high transparency in a visible light range when it has a particle size in the order of nanometer. Therefore, it is presumed that the thickness of the titanium oxide film formed on the surface of the cyclic olefin-based resin molded product this time is in the order of nanometer.

Incidentally, as the time for immersing in the mixed liquid of an aqueous solution of titanium chloride and a nitrite ion-containing aqueous solution is increased, the thickness of a titanium oxide film formed on the surface of the cyclic olefin-based resin molded product is increased depending on the time. In our experiment, it was found that the immersion time is preferably 30 minutes or less when transparency in a wavelength range of 300 to 700 nm is maintained.

Incidentally, a decrease in transparency with respect to light with a wavelength of 300 nm or less as shown in FIG. 18A is attributed to a decrease in transparency with respect to light with a wavelength of 300 nm or less of the cyclic olefin-based resin molded product itself as apparent from FIG. 18B. It is considered that the titanium oxide film itself has favorable transparency with respect to light with a wavelength of 300 nm or less.

The titanium oxide film formed on the cyclic olefin resin according to the present invention is a crystallized film in which rutile type and anatase type are mixed, and therefore, the adhesiveness between the cyclic olefin resin and the titanium oxide film is stable.

In general, a rutile-type titanium oxide film has higher transparency with respect to light with a wavelength of 300 nm or less than an anatase-type titanium oxide film.

The titanium oxide film according to the present invention includes a mixture of rutile type and anatase type, and therefore has a photocatalytic function of an anatase-type titanium oxide film, and also has a property of high transparency of a rutile-type titanium oxide film, and thus, for example, its applicability (such as application thereof to automobile windshields) is high.

Here, in the above-described examples, an excimer lamp is used as a light source which emits vacuum ultraviolet light, but it is not limited thereto, and for example, it is also possible to use a rare gas fluorescent lamp.

Figure 19A:
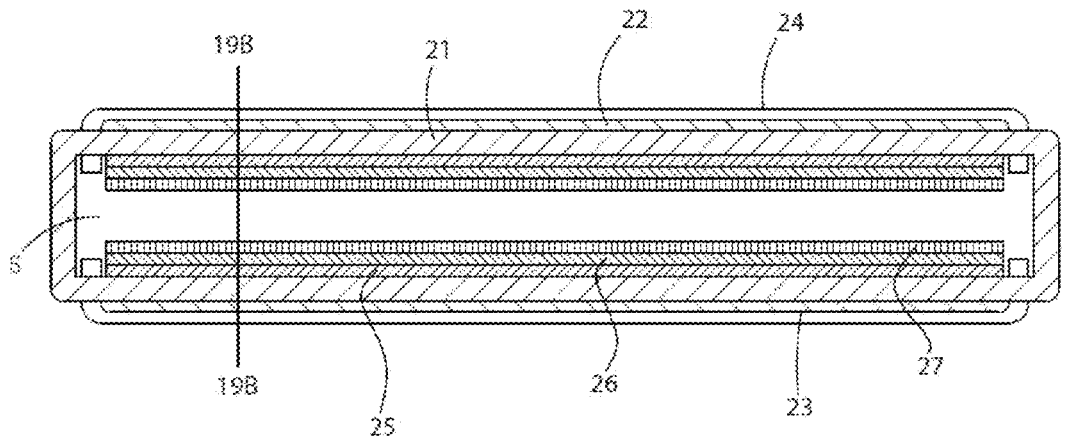
FIGS. 19A and 19B are views showing another structural example of a rare gas fluorescent lamp.
Figure 19B:
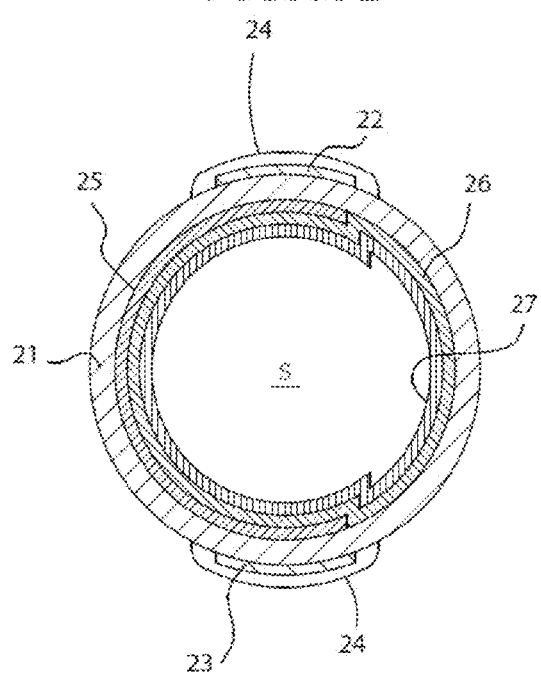

In FIGS. 19A and 19B, another structural example of a rare gas fluorescent lamp is shown. FIG. 19A shows a cross-sectional view taken along a plane including a tube axis, and FIG. 19B shows a cross-sectional view taken along the line 19B-19B of FIG. 19A. In FIGS. 19A and 19B, a lamp 20 has a pair of electrodes 22 and 23, the electrodes 22 and 23 are disposed on an outer peripheral surface of a vessel (arc tube) 21, and on the outer side of the electrodes 22 and 23, a protective film 24 is provided. An ultraviolet reflective film 25 is provided on the inner surface opposite to the light-emitting side of the inner peripheral surface of the vessel 21 (see FIG. 19B), and on the inner peripheral surface thereof, a low softening point glass layer 26 is provided. On the inner peripheral surface of this low softening point glass layer 26, a phosphor layer 27 is provided. The other structure is the same as that shown in FIG. 11, and a gas to be entrapped in a discharge space S in the vessel 21, and a phosphor to be used in the phosphor layer 27 are also the same as those described with reference to FIG. 11.

When a high-frequency voltage is applied to the electrodes 22 and 23, dielectric barrier discharge is formed between the electrodes 22 and 23, and ultraviolet light is generated as described above. Due to this, the phosphor is excited and light is generated from the phosphor layer. By suitably selecting the phosphor, for example, ultraviolet light with a center wavelength of around 190 nm is generated from the phosphor layer. This light is reflected by the ultraviolet reflective film 25 and emitted to the outside from an opening portion where the ultraviolet reflective film 25 is not provided.

Further, in the case where a region which is irradiated with vacuum ultraviolet light is small on the surface of the molded product, it is also possible to use a deuterium lamp which emits light in a wavelength range including a vacuum ultraviolet wavelength.

Figure 20:
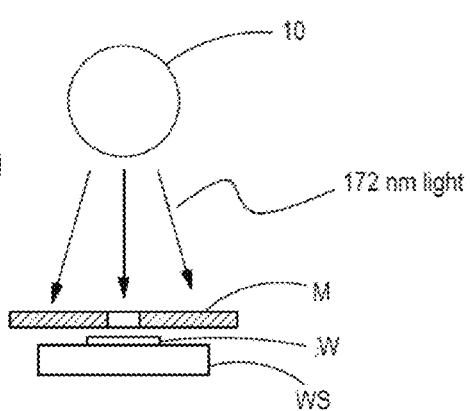
FIG. 20 is a schematic view of an experimental system in which vacuum ultraviolet light from an excimer lamp is selectively irradiated through a mask.

Incidentally, in order to selectively form a titanium oxide film on a base material composed of a cyclic olefin-based resin, for example, as shown in FIG. 20, between a base material (sample) W on a work stage WS and a light source which emits ultraviolet light (for example, an excimer lamp 10 which emits vacuum ultraviolet light), a mask M having an opening with a shape corresponding to the shape of a region where the titanium oxide film is selectively formed is disposed. Then, in Step 0, the surface of a molded product composed of a cyclic olefin-based resin is irradiated with ultraviolet light (vacuum ultraviolet light) through the mask M in an oxygen-containing air atmosphere.

As a result, on the surface of the molded product composed of a cyclic olefin-based resin, only in a region corresponding to the shape of the opening of the mask M, the cleavage of the olefin ring and the introduction of oxygen are carried out. Thereafter, an immersion step (Step 1) in which the base material is immersed in a mixed liquid of an aqueous solution of titanium chloride and a nitrite ion-containing aqueous solution, a washing step (reaction stopping step: Step 2) in which the base material is pulled out from the mixed liquid after the lapse of a predetermined time and washed with pure water or the like, and a drying step (Step 3) in which the base material is dried at room temperature are performed, whereby a titanium oxide film can be selectively formed on the surface of the molded product composed of a cyclic olefin-based resin.

The preceding description has been presented only to illustrate and describe exemplary embodiments of the present method for forming titanium oxide film on a surface of a molded product composed of cyclic olefin resin. It is not intended to be exhaustive or to limit the invention to any precise form disclosed. It will be understood by those skilled in the art that various changes may be made and equivalents may be substituted for elements thereof without departing from the scope of the invention. In addition, many modifications may be made to adapt a particular situation or material to the teachings of the invention without departing from the essential scope. Therefore, it is intended that the invention not be limited to the particular embodiment disclosed as the best mode contemplated for carrying out this invention, but that the invention will include all embodiments falling within the scope of the claims. The invention may be practiced otherwise than is specifically explained and illustrated without departing from its spirit or scope.

What is claimed is:

1. A method for forming a titanium oxide film on a surface of a molded product composed of a cyclic olefin resin, comprising:

preparing a molded product that contains a cyclic olefin resin;

irradiating a surface of the molded product with a light that includes ultraviolet light of a wavelength of 340 nm or less;

oxygenating the surface of the molded product;

immersing the molded product in a mixed liquid of an aqueous solution of titanium chloride and a nitrite ion-containing aqueous solution after irradiating and oxygenating the surface of the molded product.

2. The method for forming a titanium oxide film on a surface of a molded product composed of a cyclic olefin resin according to claim 1, further comprising:

pulling out the molded product from the mixed liquid;

washing the molded product with water to stop the film forming process, and drying the molded product at room temperature.

3. The method for forming a titanium oxide film on a surface of a molded product composed of a cyclic olefin resin according to claim 1, a portion of the surface of the molded product is selectively irradiated with the ultraviolet light, and the titanium oxide film is formed on the selectively irradiated surface.

4. The method for forming a titanium oxide film on a surface of a molded product composed of a cyclic olefin resin according to claim 1, wherein the ultraviolet light has a wavelength of 180 nm or less when irradiating the surface of the molded product.

5. The method for forming a titanium oxide film on a surface of a molded product composed of a cyclic olefin resin according to claim 1, wherein oxygenating the surface of the molded product is performed after irradiating the surface of the molded product.

6. The method for forming a titanium oxide film on a surface of a molded product composed of a cyclic olefin resin according to claim 4, wherein oxygenating the surface of the molded product is performed after irradiating the surface of the molded product.

* * * * *